(12) United States Patent
Foucher

(10) Patent No.: US 11,772,736 B2
(45) Date of Patent: Oct. 3, 2023

(54) BICYCLE AND TRICYCLE SAFETY DISTANCE BUFFER APPARATUS

(71) Applicant: Raymond J. Foucher, Lakeland, FL (US)

(72) Inventor: Raymond J. Foucher, Lakeland, FL (US)

(*) Notice: Subject to any disclaimer, the term of this patent is extended or adjusted under 35 U.S.C. 154(b) by 443 days.

(21) Appl. No.: 16/945,977

(22) Filed: Aug. 3, 2020

(65) Prior Publication Data
US 2022/0033023 A1  Feb. 3, 2022

(51) Int. Cl.
 *B62J 27/30* (2020.01)
 *B62J 45/00* (2020.01)
 *B62J 6/015* (2020.01)

(52) U.S. Cl.
 CPC .............. *B62J 27/30* (2020.02); *B62J 6/015* (2020.02); *B62J 45/00* (2020.02)

(58) Field of Classification Search
 CPC ............. B62J 27/30; B62J 6/015; B62J 45/00
 See application file for complete search history.

(56) References Cited

U.S. PATENT DOCUMENTS

| | | | | |
|---|---|---|---|---|
| 1,794,014 A | * | 2/1931 | Gutierrez | B60Q 1/34 116/46 |
| 2,540,394 A | * | 2/1951 | Hollingsworth | B62J 6/052 116/52 |
| 3,945,336 A | | 3/1976 | Harris | |
| 3,967,575 A | | 7/1976 | Coutts | |
| 3,972,302 A | | 8/1976 | Sherman | |
| 3,982,771 A | * | 9/1976 | Tropeano | B62J 6/20 280/288.4 |
| 4,038,935 A | * | 8/1977 | Margiloff | B60Q 1/36 280/288.4 |
| 4,116,154 A | | 9/1978 | Harris | |

(Continued)

OTHER PUBLICATIONS

Mandelbaum, PPA 2012/0060746-A1, Mar. 15, 2012 (enclosed).

(Continued)

*Primary Examiner* — Minnah L Seoh
*Assistant Examiner* — Michael R Stabley

(57) ABSTRACT

The embodiments show an efficient, flexible, durable, lightweight and portable (12) electromechanical apparatus (12) that a cyclist can easily and safely operate. The design allows for the remote positioning of a visible elongated object, (12) safety sleeve/arm (12), from a secured vertical stowed position, to a secured horizontal active position without stopping during the ride. The elongated, aerodynamically shaped (12) safety sleeve (12) will have (12) LED strip lights (12) along the trailing edge, along with a (12) wing tip light (12) at the end of the member. Also included are reflective materials at both ends and on the leading edge of the (12) safety sleeve (12). The purpose of a (12) safety sleeve/arm (12) in the active horizontal position is to provide oncoming motorists with a dimensional frame of reference to clear the pedal vehicle when passing. Because of the size and shape of the lighted safety member, a motorist will receive the early detection needed, allowing them time to maneuver their vehicle around the cyclist. Thus, providing adequate clearance between the cyclist and motorist when passing, which will help them to comply with the 3 foot rule enacted in 33 states in the USA.

10 Claims, 23 Drawing Sheets

(56) References Cited

U.S. PATENT DOCUMENTS

Figure 14:
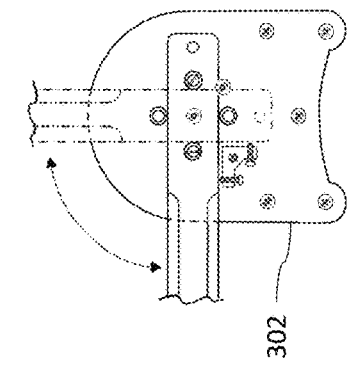

| | | | |
|---|---|---|---|
| 4,342,280 A | | 8/1982 | Ashworth |
| 4,422,615 A | | 12/1983 | McMannus |
| 4,575,189 A | * | 3/1986 | Johnson ............... B62J 6/20 280/288.4 |
| 4,586,454 A | | 5/1986 | Hedquist |
| 4,852,970 A | * | 8/1989 | Kitrell ................. B62J 6/20 248/478 |
| 5,379,197 A | | 1/1995 | Conyers |
| 5,418,696 A | * | 5/1995 | Izzo, Sr. ............. B62J 6/015 362/418 |
| 6,808,298 B2 | * | 10/2004 | Christensen ........... B62J 6/05 362/523 |
| 9,067,535 B2 | * | 6/2015 | Freiser ................ B62J 6/045 |
| 9,889,899 B2 | * | 2/2018 | Braggin ............... B62J 6/04 |
| 10,155,557 B2 | | 12/2018 | Alvarez |
| 2011/0261453 A1 | * | 10/2011 | Felt ................ A42B 3/0493 359/842 |

OTHER PUBLICATIONS

Braggin, PPA 2016/0023703-A1, Jan. 28, 2016 (enclosed).

Biking To Work? Don't Forget Your Pool Noodle! (enclosed) May 20, 2019, Author unknown.

"Cyclists all over the world are using pool noodles" . . . (enclosed) Date & Author unknown.

"Cyclist 'praised' for 'genius' pool noodle bike hack", (enclosed) May 27, 2019 Yahoo News Australia, Author unknown.

"It's late March . . . first leg of our 2,000 mile bicycle trip" . . . (enclosed) Date & Author unknown.

"I rode around San Francisco with a pool noodle attached to my bike" . . . (enclosed), by Michelle Robertson, Jun. 7, 2019 . . . SFGATE.

"State Safe Bicycle Passing Laws", by Douglas Shinkle, Aug. 2018, NCSL, vol. 26, No. 32 (enclosed).

* cited by examiner

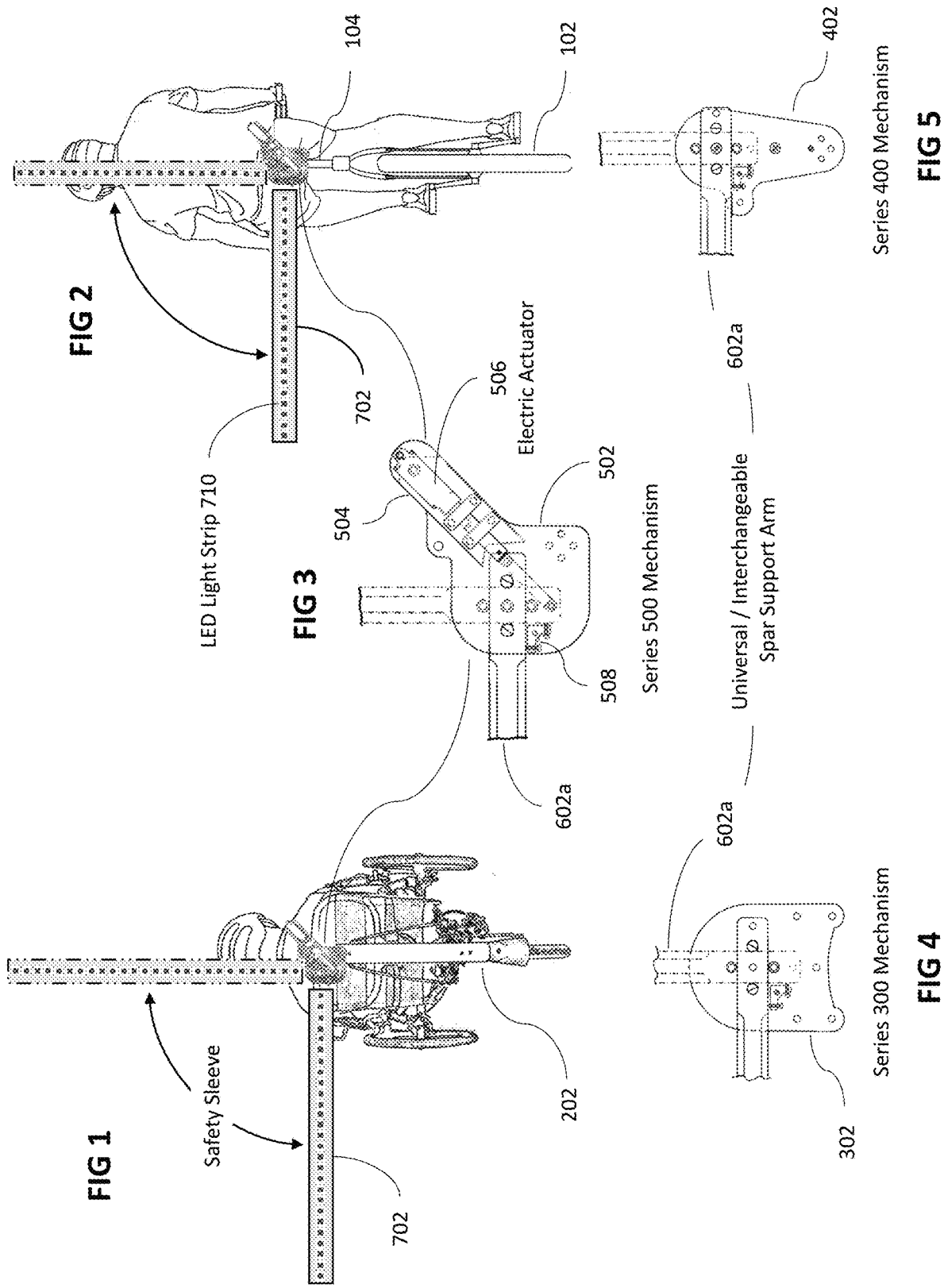

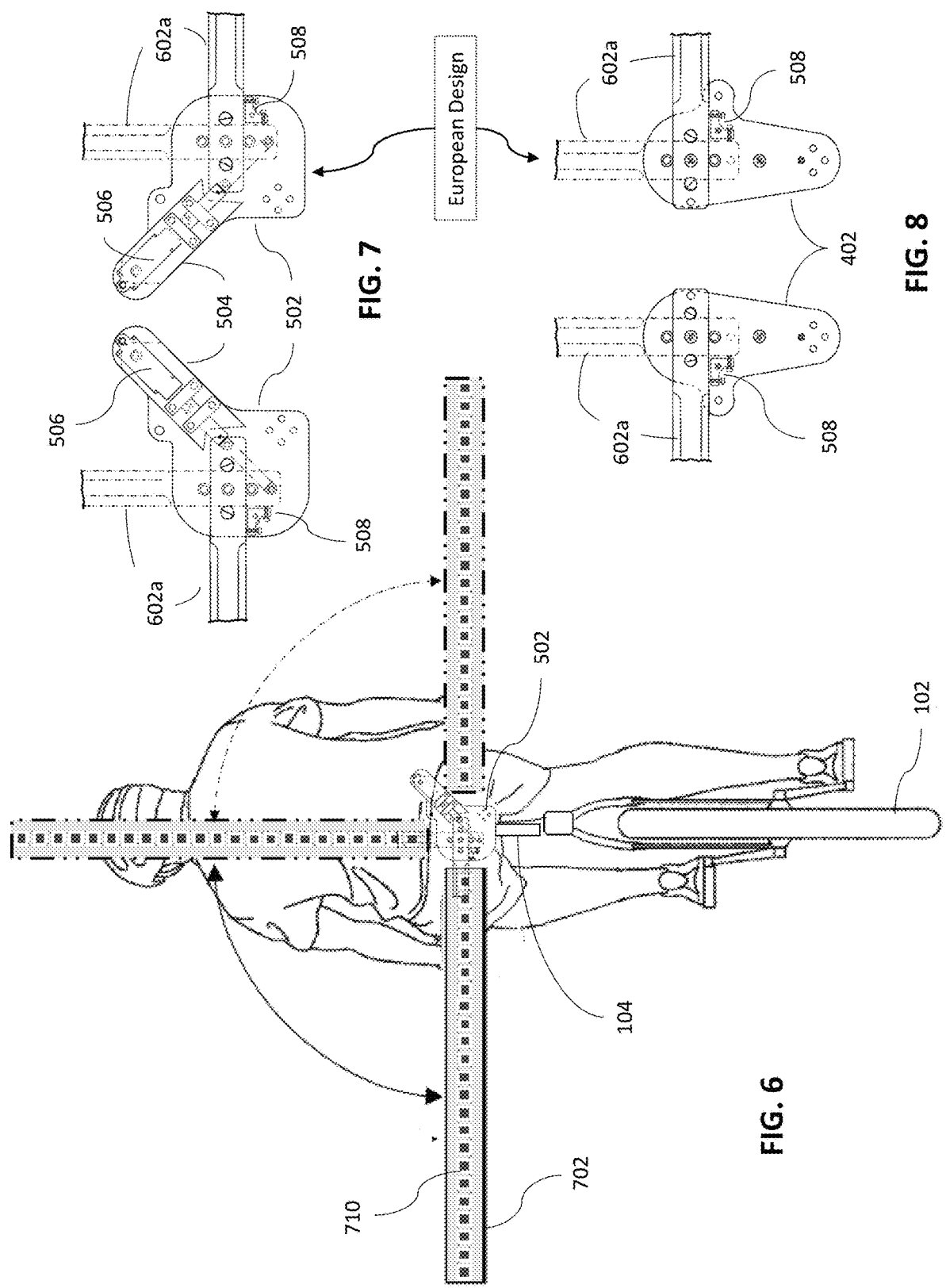

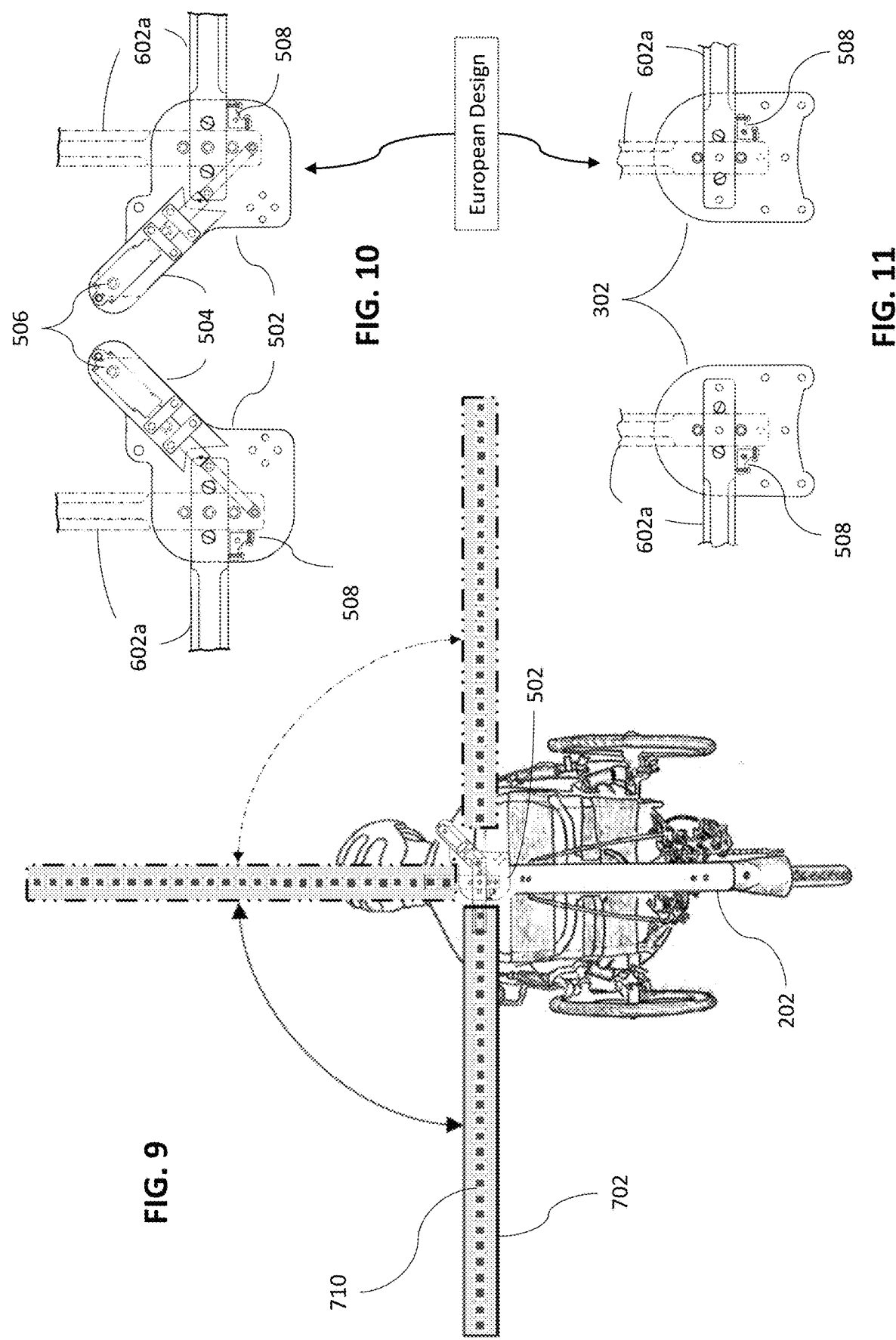

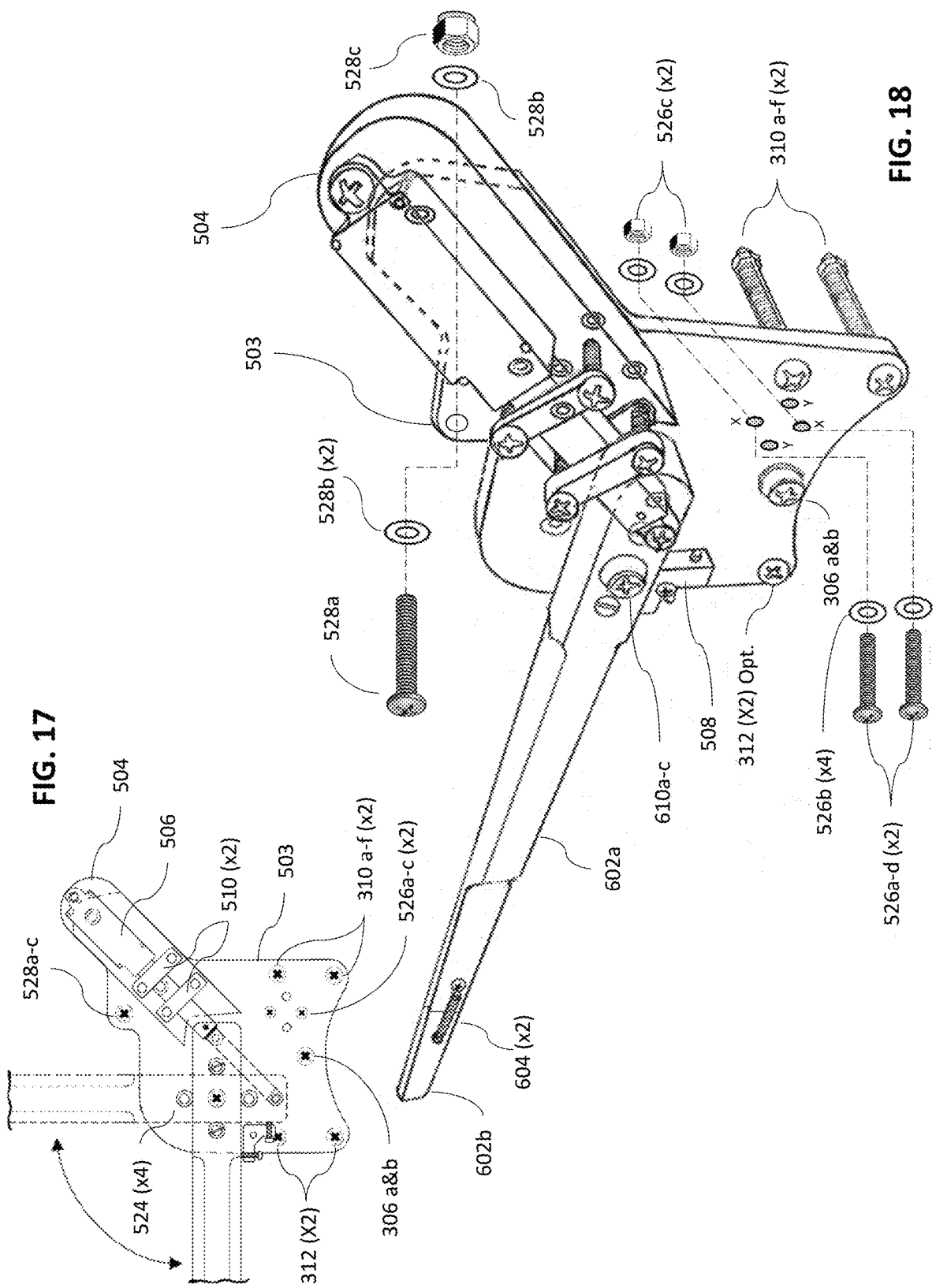

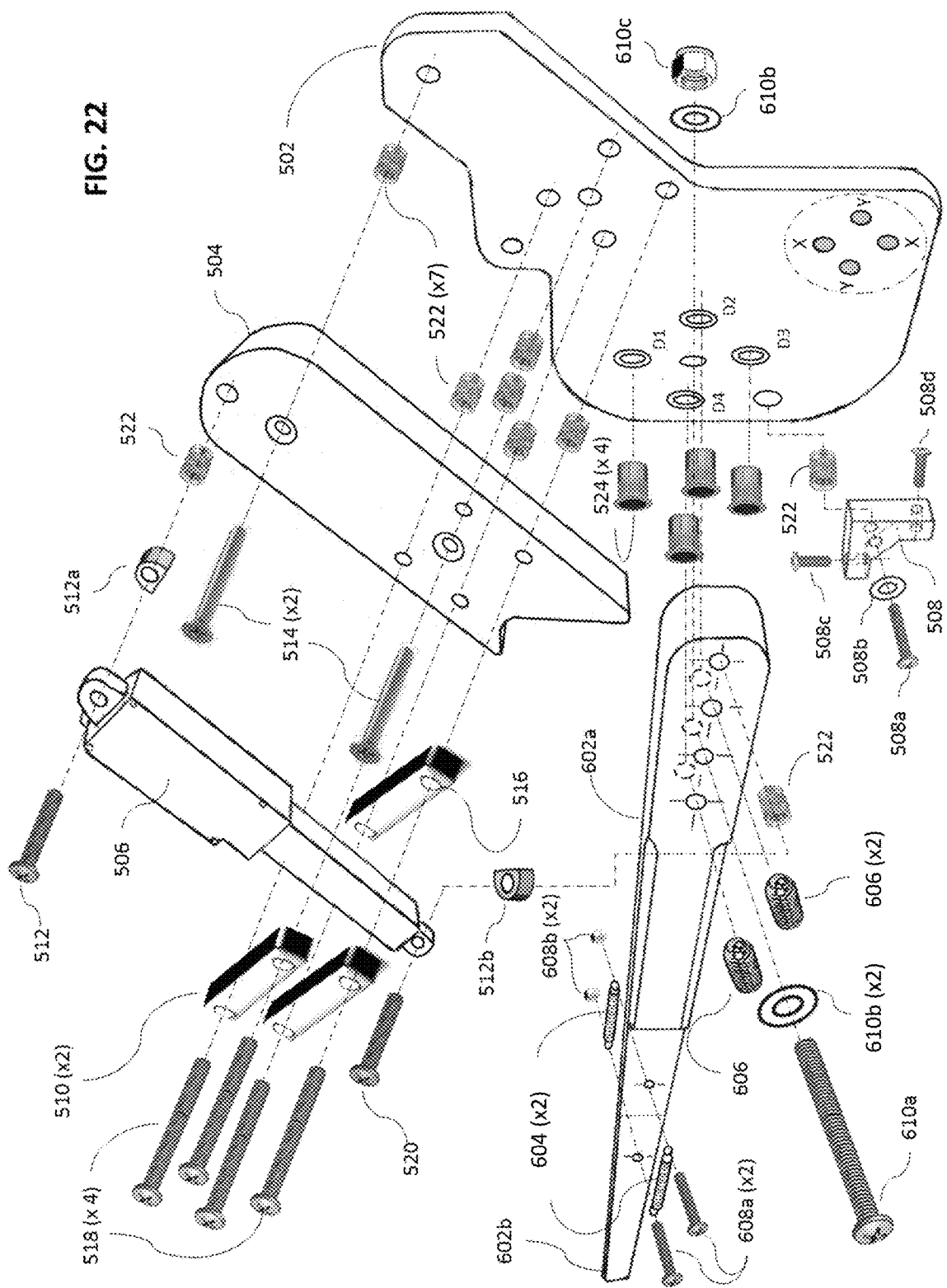

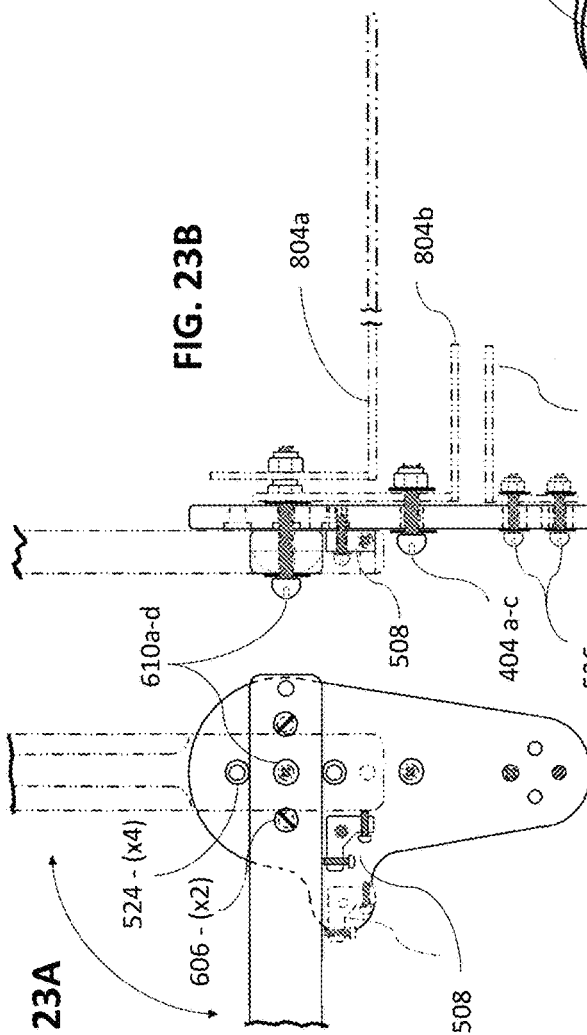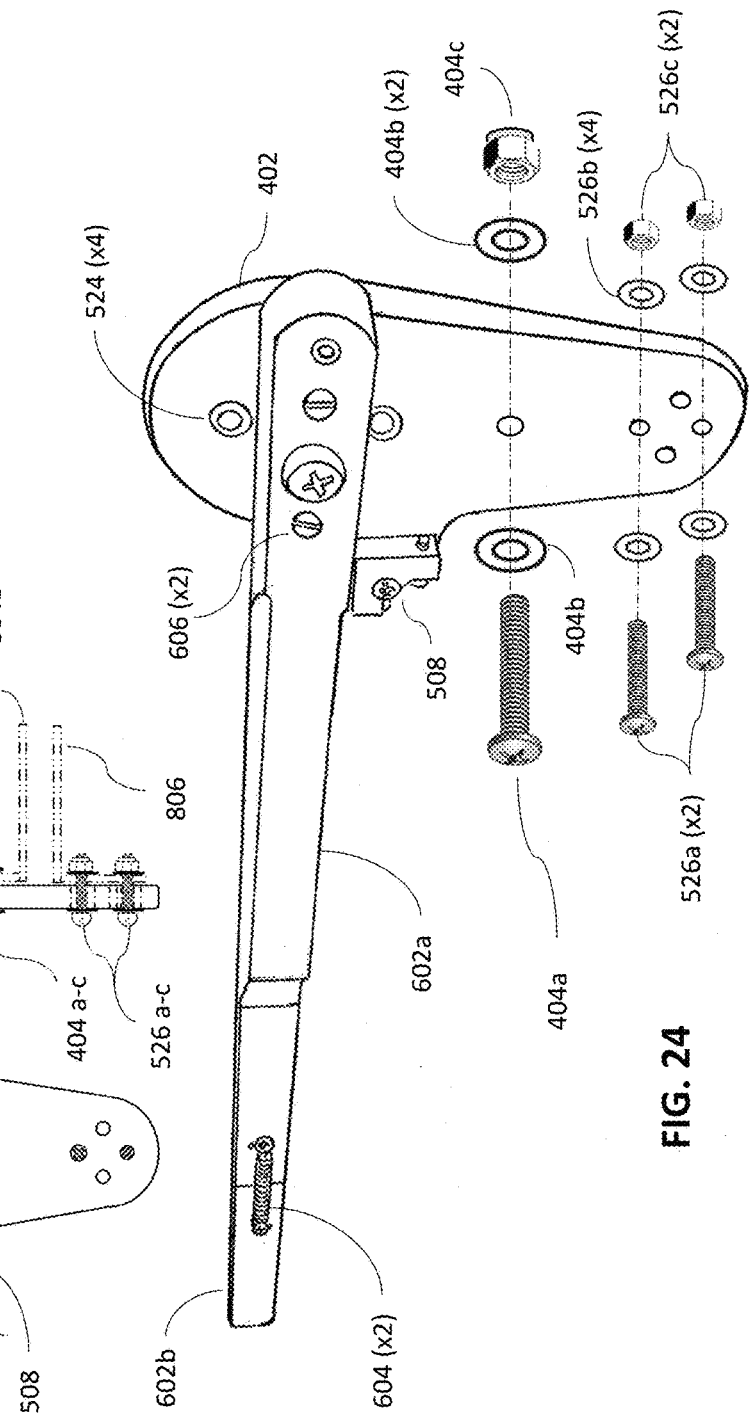

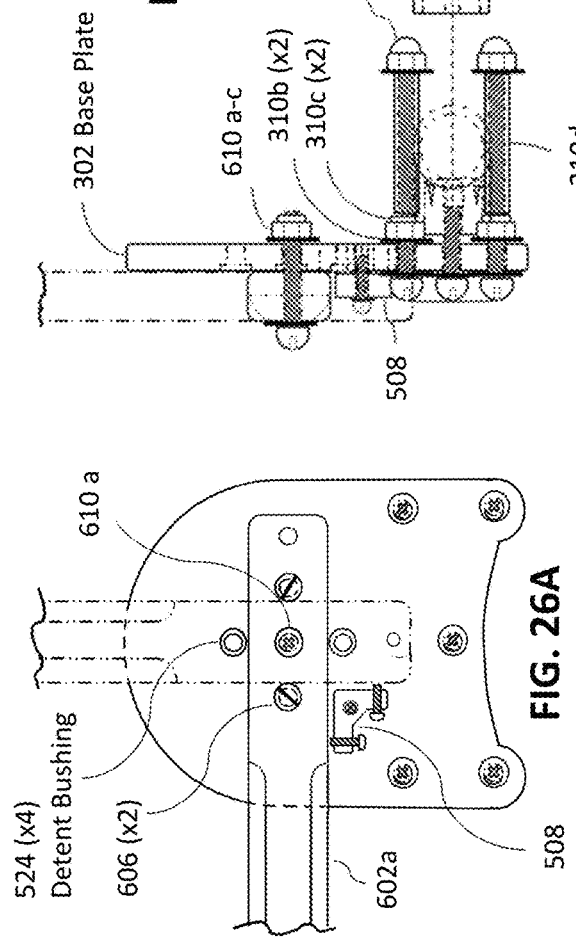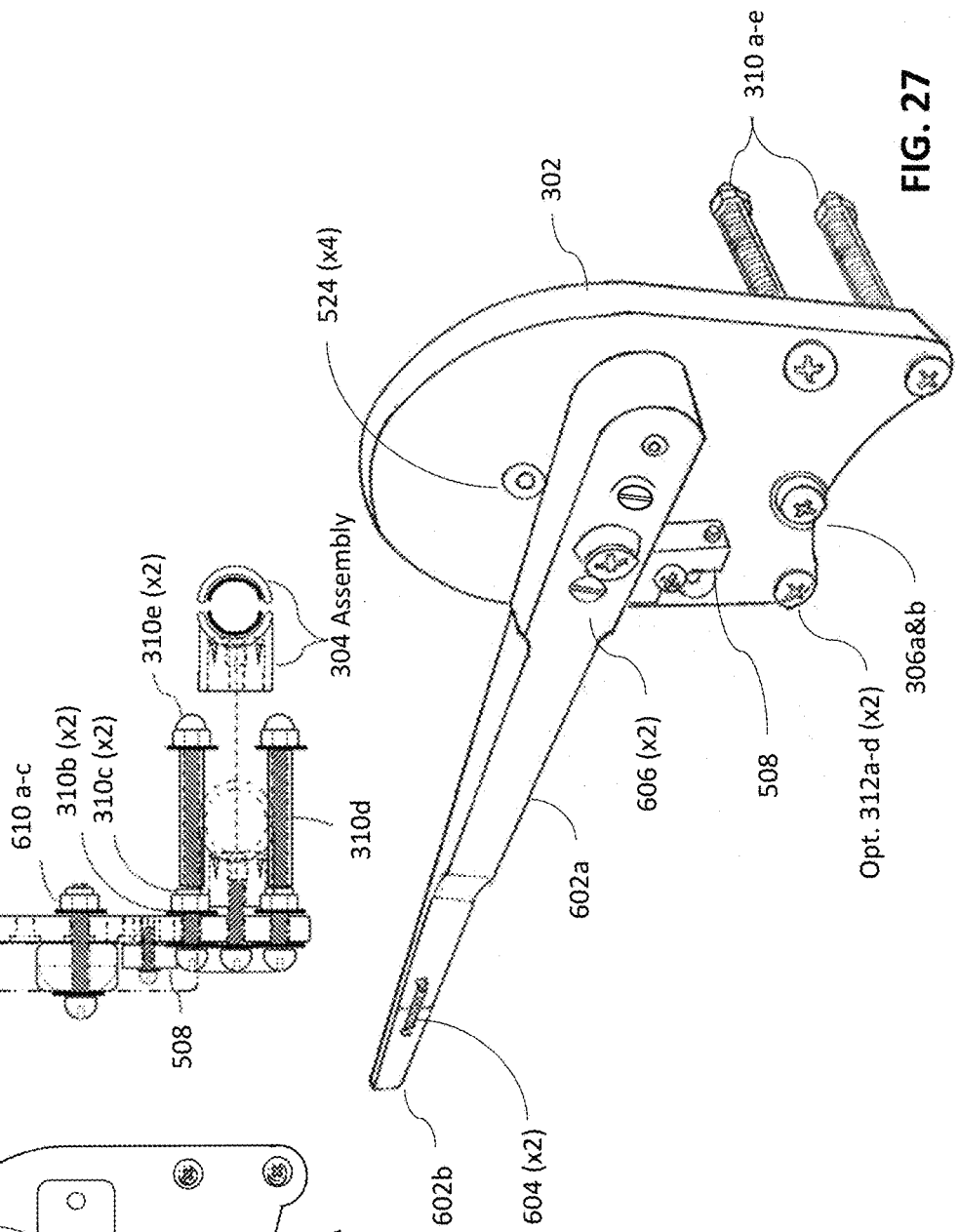

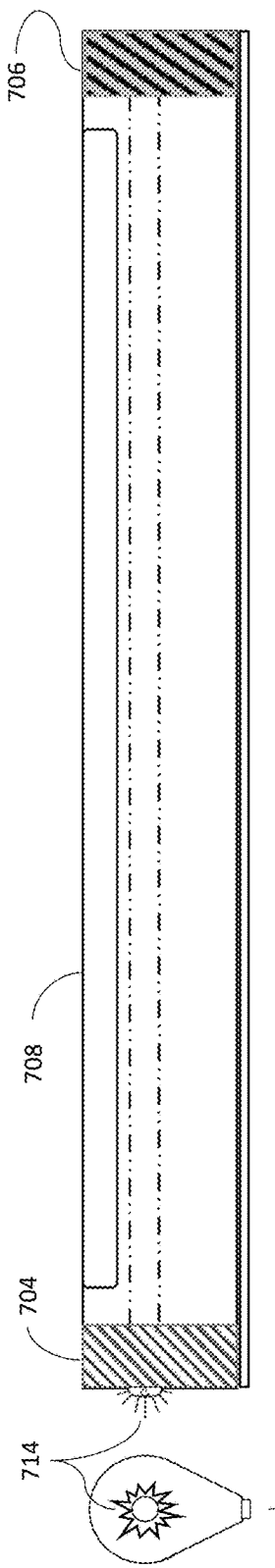
FIG. 33
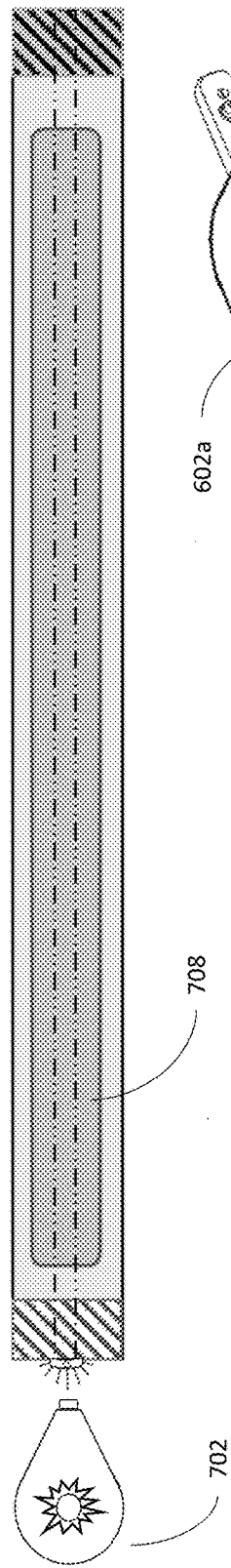
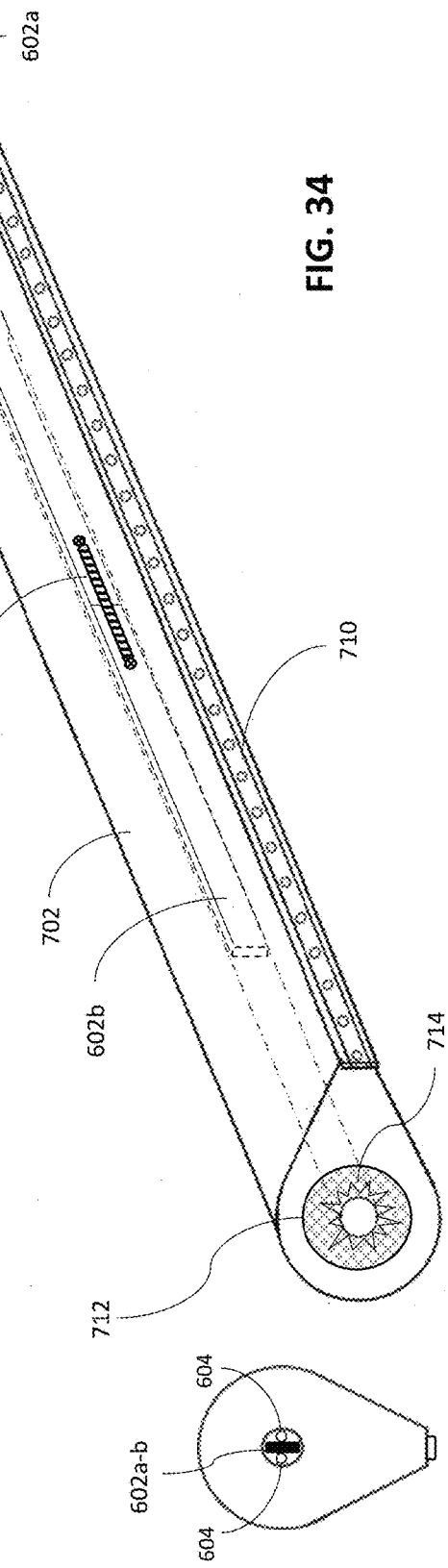
FIG. 34

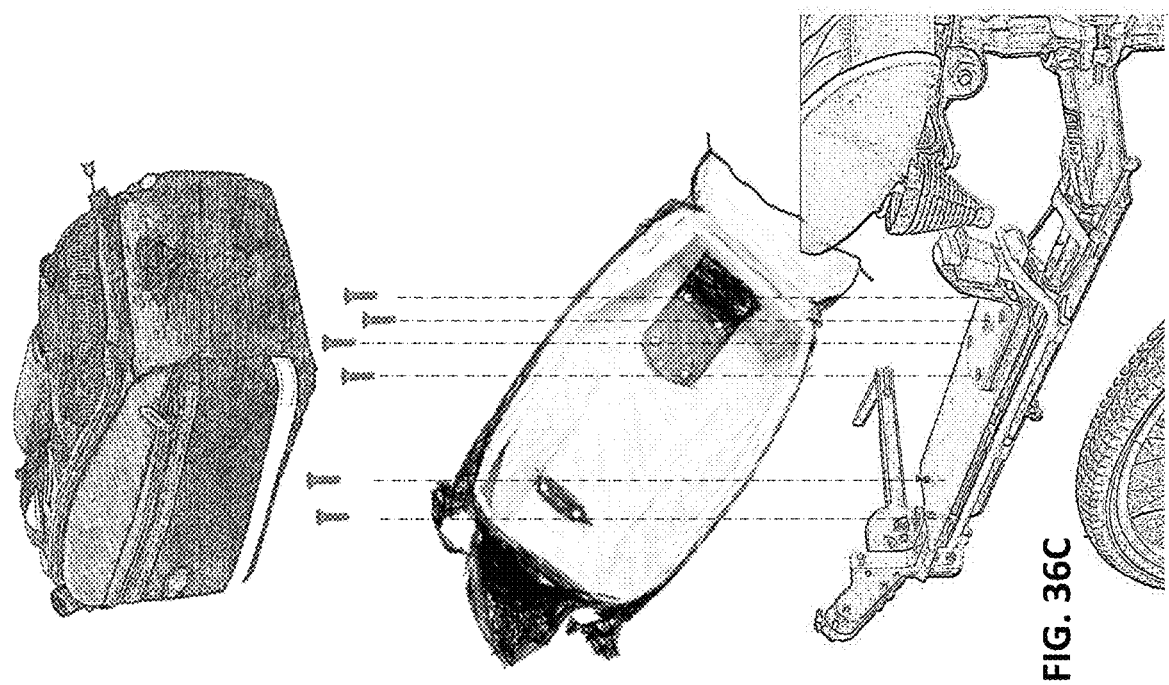
FIG. 36C
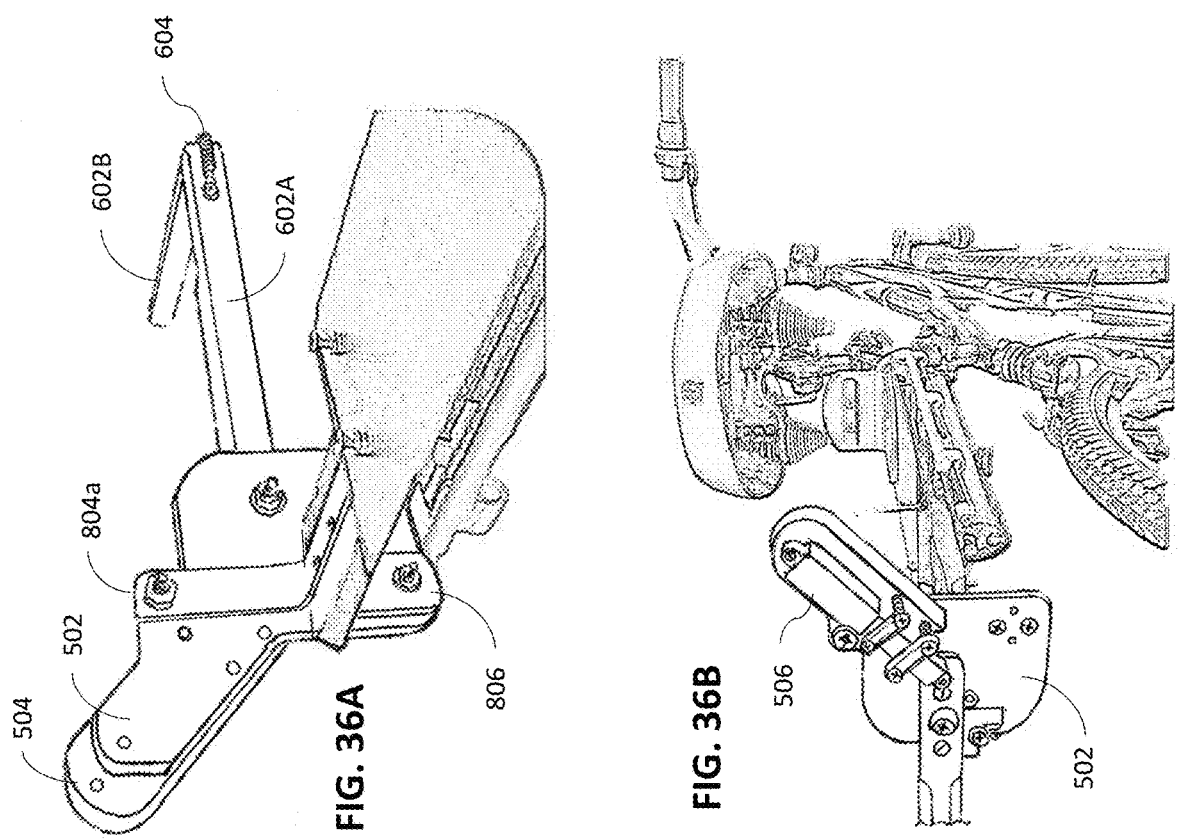
FIG. 36A
FIG. 36B

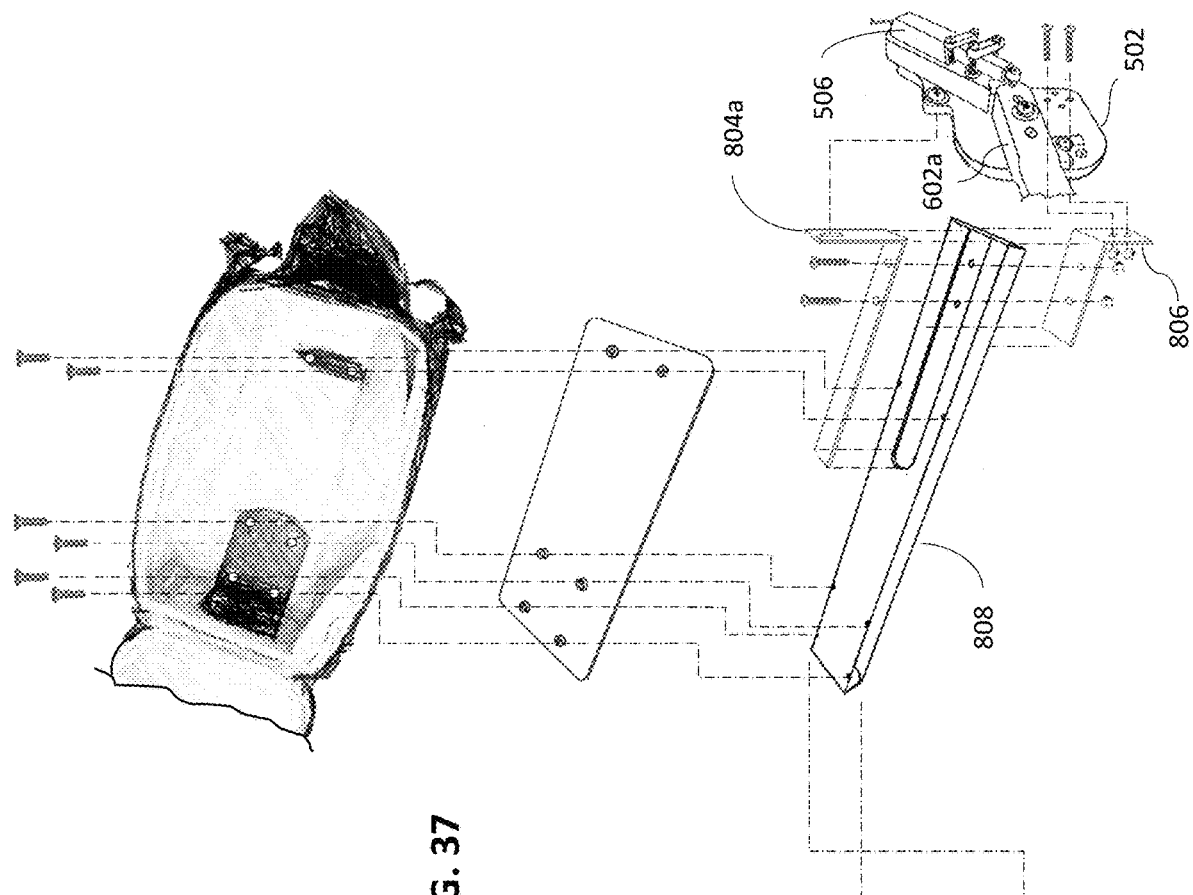
FIG. 37
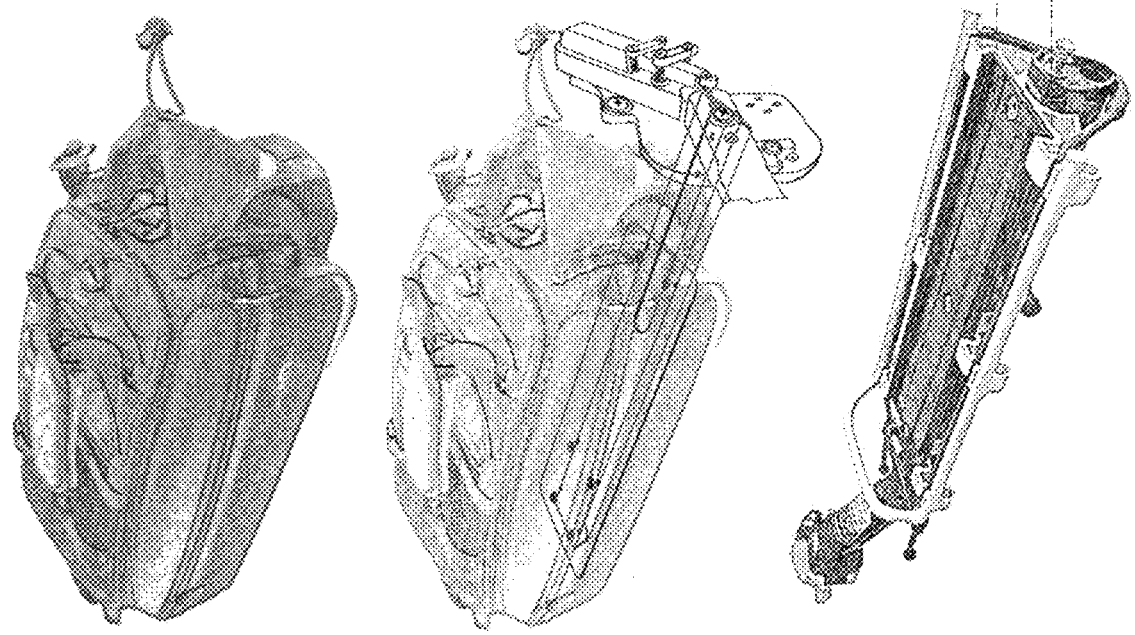

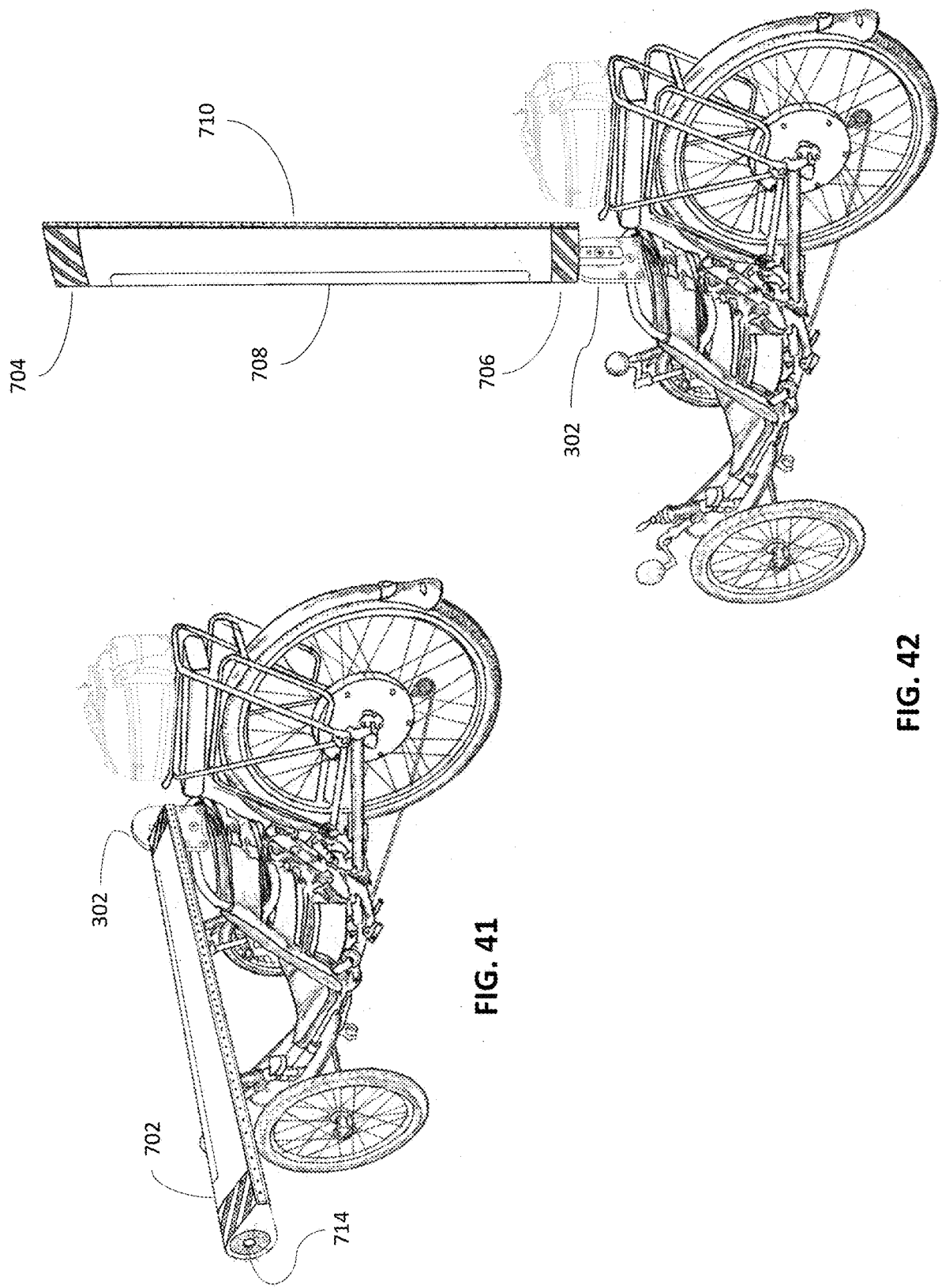

US 11,772,736 B2

BICYCLE AND TRICYCLE SAFETY DISTANCE BUFFER APPARATUS

CROSS-REFERENCE TO RELATED APPLICATIONS

This application claims the benefit of provisional patent application Ser. No. 62/883,041, filed 2019 Aug. 5 by the inventor.

BACKGROUND

Prior Art

The following is a tabulation of some prior art that presently appears relevant:

U.S. PATENTS

| Pat. No. | Kind Code | Issue Date | Patentee |
| --- | --- | --- | --- |
| U.S. Pat. No. 3,945,336 | | Mar. 23, 1976 | Harris |
| U.S. Pat. No. 3,967,575 | | Jul. 6, 1976 | Coutts |
| U.S. Pat. No. 3,972,302 | | Aug. 3, 1976 | Sherman |
| U.S. Pat. No. 4,116,154 | | Sep. 26, 1978 | Harris |
| U.S. Pat. No. 4,342,280 | | Aug. 3, 1982 | Ashworth |
| U.S. Pat. No. 4,422,615 | | Dec. 27, 1983 | McMannus |
| U.S. Pat. No. 4,586,454 | | May 6, 1986 | Hedquist |
| U.S. Pat. No. 4,598,339 | | Jul. 1, 1986 | Ainsworth |
| U.S. Pat. No. 5,379,197 | | Jan. 3, 1995 | Conyers |
| U.S. Pat. No. 8,905,611 | B2 | Dec. 9, 2014 | Connor |
| U.S. Pat. No. 10,155,557 | B2 | Dec. 18, 2018 | Alvarez |

U.S. Patent Application Publications

| Publication No. | Kind Code | Pub. Date | Applicant |
| --- | --- | --- | --- |
| U.S. 2012/0060746 | A1 | Mar. 15, 2012 | Mandelbaum |
| U.S. 2016/0023703 | A1 | Jan. 28, 2016 | Braggin |

Foreign Patent Documents

| Foreign Doc. No. | Cntry Code | Kind Code | Pub Dt. | Applicant or Patentee |
| --- | --- | --- | --- | --- |

Non-Patent Literature Documents (www.ncsl.org/research/transportation/safety-passing-bicyclists.aspx).

Background

Accidents between motorists and the pedal cyclists are on the rise, which in many cases result in death or significant injuries to a cyclist. Therefore, visibility has developed into one of the most critical topics within the cycling community today. Lights, reflectors and reflective clothing help visibility during early morning or evening rides, but these items offer little in the realm of security during the day. One of the more important issues currently being experienced across the USA and other countries is sideswipe accidents that usually occur due to the motorist not recognizing that a cyclist is in the street ahead of them, or the perception of how close they are to the cyclist when passing.

As of April 2020, 33 states passed a minimum 3 foot rule. The states implementing the laws require a motorist to yield to a cyclist on the highway. Depending on the local state regulations, the minimum clearance can vary from 2 feet to 5 feet when passing a cyclist. Generally this clearance between the motorist's vehicle and cyclist should increase an additional 12 inches for every 10 MPH over 30 MPH. However, because a vast majority of motorists are either unaware or ignore the local laws, many sideswipe accidents result, commonly causing serious injury, or even death to the cyclist. Unfortunately, it appears that enforcement of these laws is likely to be lax.

Because more of the working population has transitioned to become commuting cyclists, this has created even a further need for a safety device that helps provide a motorist with a perspective measure of distance between their vehicle and the cyclist. Therefore, it is imperative to have a safety distance device that will act to create a buffer zone that is clearly visible to the motorist when passing a cyclist, be it during the day or in the evening.

Other safety devices previously developed to increase visibility of pedal vehicles during the evening, dusk or dawn hours of operation, were focused primarily on bicycles. However, these devices are deficient due to the limitations of design and/or technology at that time.

Many cyclists have used only reflectors as an indication source, while a few others use lights or a combination of both. Some designs have reflectors and/or flags fix mounted on members that extend outward a short distance perpendicular from the bicycle frame. These safety methods in which reflectors, or flags mounted on horizontal extending members, serve two functions. The horizontal extension seeks to persuade a motorist to allow sufficient clearance when passing, and the reflector is an attempt to present more visibility. U.S. Pat. No. 3,945,336 (Harris), U.S. Pat. No. 3,967,575 (Coutts), U.S. Pat. No. 3,972,302 (Sherman), U.S. Pat. No. 4,116,154 (Harris), U.S. Pat. No. 4,342,280 (Ashworth), U.S. Pat. No. 4,422,615 (McMannus), U.S. Pat. No. 4,586,454 (Hedquist). However, the deficiency of these methods result from the very nature of reflectors/flags. Without incident light, reflectors are inadequate.

Flags, when viewed from behind a pedal vehicle, are difficult to see during daylight hours by a motorist. Although these safety devices cause the actual presence of a cyclist to be more noticeable to motorists, reflectors and/or flags are deficient to dissuade a motorist from passing too close. During early morning or dusk conditions, there is not enough incident light to offer any advantages to the cyclist that use reflectors and/or flags. During evening hours, without house or street lights, the shortcoming of reflectors is they are only effective when headlight beams from the motorist's vehicle enters the reflective path of the device. Often, this is too late for the motorist to respond as they are about to overtake a cyclist, especially when approaching the cyclist on a curve.

In alternate attempts to address cyclist visibility problems during nighttime operation, they mount lighted safety devices on vertical poles, or short horizontally extending members. Although these safety devices help to make a cyclist more noticeable to motorists at night, they too are deficient because of failing to dissuade a motorist from passing too close. U.S. Pat. No. 4,598,339 (Ainsworth), U.S. Pat. No. 5,379,197 (Conyers), U.S. Pat. No. 8,905,611 B2 (Connor), U.S. Pat. No. 10,155,557 B2 (Alvarez), PPA US 2012/0063153 A1 (Sherwin).

The shortcoming of these aforementioned devices is as follows . . .

(a) Light intensity has marginal brilliance.
(b) Using lights only are marginally effective during daytime hours.

(c) A safety device(s) installed in an inaccessible location on the pedal vehicle is often awkward to operate. This makes it difficult, if not dangerous for the rider to position the safety device from a stowed (inactive) position, to an (active) position while riding.

(d) Sometimes the location of indicators, with or without lights, are too low to the ground, thus not easily visible from behind. Or, they are in an area that would interfere with the rear bike/trike luggage carrier rack, bag, or pannier (saddle) bags.

(e) Devices mounted on extension members are usually too short and do not protrude far enough away from the bike/trike frame to define a wide safety zone of clearance that a vehicle should not enter.

(f) Should the user install a longer extension member, it often requires a deflection point along the entire longitudinal axis of the laterally extending rigid member. Because of this limitation, along with the rigid member's inability to absorb energy from a collision with an external object, damage to both the external object and the rigid member is likely to occur.

Also, depending on the weight of the extension member, such a single joint configuration can limit the width of the safety zone spanned. What it often needs is a relatively strong (inflexible) spring to keep the rigid part from drooping downward. This is even more of an issue if they attach a light to the end of the rigid member. However, this strong inflexible spring approach further inhibits the flexibility needed to avoid damage not only to the device, but also to other objects impacted by the extension member.

Some devices in this prior art category seek to resolve this issue by having friction based hinge or ball joint instead of a flexible spring joint. However, hinging will only allow a rigid member to fold upwards or downwards and would break if hit front-to-back by an external object such as a post, tree, car, or pedestrian. Once the rigid, laterally extending member deflects (backwards and/or inwards) by a collision with an external object, it does not automatically return to its original configuration, even if damage to the rigid member does not happen by such a collision.

(g) In another more recently discussed prior art category is the use of a standard low density, closed cell PE (polyethylene) pool swim noodle as an "Automobile Deterrent Device For Bicycle", Ref. PPA US 2012/0060746 A1 (Mandelbaum). Although this is an inexpensive and effective method to create the safety zone around a bicycle, the use of a PE pool swim noodle has its shortcomings.

i. Because the pool noodle itself is overly flexible, without a method of mechanical supporting this device, there is very little control over a vertical or horizontal positioning. Therefore, the device is cumbersome to apply and operate when used for normal activity with a bike or trike pedal vehicle.
  ii. Strapping a pool noodle to a bike rack, or similar object, is less than desirable. Should the cyclist need to transition from a road or highway onto a bike trail or sidewalk, it would require the cyclist to stop, dismount, and then tie this pool noodle onto the pedal vehicle in such a manner to keep it from protruding beyond the width of the cyclist. This action ensures it will not impact pedestrians, other cyclists, or objects like trees, posts, bushes, poles, fences, etc. Often this situational event occurs multiple times during a ride and is very inconvenient at the least.
  iii. Images of a pool noodle dangling (drooping) from the back end of a bike or trike is less than esthetically appealing. A cyclist that has a significant investment in his/her bike or trike is less likely to install a pool swim noodle on their vehicle.
  iv. Effectiveness of this prior art concept is greater during the day than other prior art mentioned, but using this device at night, with just reflection strips, will not suffice.
  v. Over a brief period, continued UV exposure causes a breakdown of the structural integrity of this very low density PE (polyethylene) pool noodle material.

All the above devices described are hand (manually) operated. To safely access and actuate these devices often requires the cyclist to stop and sometimes dismount to position the safety indicator device into the horizontal (active) position, or into the vertical (stowed) position and vice versa. Because bike trails are often not readily available or convenient, cyclists may resort to riding on sidewalks that connect to roads and/or public highways with, or without bike paths to complete their journey. When riding on sidewalks or bike trails, the cyclist must consider and allow for pedestrian encounters, yet be prepared for motorists when traveling on the roads and highways. At a minimum, it is very inconvenient that during a ride the cyclist must stop to manually move the safety indicator from an active to inactive position and vice versa. This sequence of events are also hazardous to the cyclist, for if they don't notice the rigid member is out of place, the cyclist is no longer protected when traveling the roads or highways. For these reasons, there are serious limitations to using rigid, relatively wide lights, reflectors and/or flags in the prior art categories discussed.

Therefore at the very least, a cyclist needs a better solution to secure a safe zone of operation, with a better, more reliable safety distance buffer apparatus.

SUMMARY

The embodiment disclosed herein serves as both a hand operated device, or a semi-automatic electromechanical apparatus. All designed to help establish a safe passing zone around a two-wheel and three wheeled pedal vehicle.

This portable, lightweight, flexible and durable apparatus will provide a cyclist with a means to help motorists recognize a pedal vehicle is present on the roadway, either during the day or at night. The device used will have a highly visible member (safety arm) extending out and perpendicular from the cyclist's vehicle to create a zone of safe passage. The safety arm is of a bright safety color and has brilliant LED lights, along with reflective material attached. This visual combination will alert a motorist of the cyclist's presence on the road day or night, thus helping the motorist to develop a dimensional perspective of clearance needed to safely pass the cyclist. This device allows the motorist enough time to maneuver their car or truck around the cyclist to achieve the minimum 3 foot safety buffer zone as required by law in a majority of U.S. States.

Advantages (a) Materials of construction:
  i. All base plates and other rigid components used are fabricated from a lightweight, flexible and durable high density polyethylene (HDPE). This material will not rot, swell, splinter, or delaminate when exposed to humidity or water. Yet other plastic materials, composites, or some metals are also suitable.

ii. The design of the aerodynamic wing shaped safety sleeve is fabricated from a very-low-density XLPE (Cross linked Polyethylene foam). This is a lightweight, highly flexible and durable material not subject to UV deterioration.

(b) All stainless steel assembly hardware components are used.

(c) The universal, robust mechanical indexing apparatus is identical for all base plate shapes, with simple component interchangeability to suit the application.

(d) The cyclist can control the semi-automatic electromechanical actuated systems via a remote direct wired or wireless key fob mounted on or near the handlebar, which eliminates the need for additional wiring. This remote switch allows the cyclist to comfortably and safely move the safety arm from the vertical stowed position, to the horizontal active position without having to unnecessarily stop during the ride.

(e) Manual hand operation of this device is optional, along with the other hand operated (HO) systems available. These alternative HO devices are shown in embodiment FIG. 4, series 300 and embodiment FIG. 5 series 400 models.

(f) The airfoil shaped XLPE foam safety sleeve design with rounded features, is much less likely to snag on something that would cause damage to the apparatus, or to a vehicle from a resulting impact. This design also accommodates potential impact with trees, posts, fences, shrubbery and other cyclists or pedestrians.

(g) A supporting spar arm is manufactured from a flexible high density HDPE material. The shape of the arm helps to magnify the inherent high deflection/recovery resiliency provided by this material. Therefore, the spar arm will remain structurally intact even after severe flexure. A breakaway knuckle type joint design, further enhances spar arm movement in the event of impact. Because the XLPE safety sleeve has a longitudinal through-hole design, the spar arm with the breakaway spring mechanism is captured within the sleeve's hollow cavity. Therefore the sleeve/arm is capable of a 360 degree movement without suffering dislocation of the breakaway joint and thus returns to its original configuration after impact.

(h) MOUNTING: All device sizes shown from series 300 to 500 are designed for ease of installation on a myriad number of bicycle/tricycle frames and/or traditional luggage carrier racks.

(i) Design allows for the ease of conversion to adapt to our European neighbors that ride the opposite side of roadways.

(j) Replacement components are easy to install.

(k) Ultra-brilliant LED strip lights are very effective, even for daytime operation, thus enhancing the visual recognition of the safety device by a motorist from a reasonable distance. This allows the motorist to make an early evasive maneuver for safe passage around the cyclist.

(l) LED strip lights are clearly seen up to a 90 degree angle, while the wing tip light promotes a 360 degree visibility when the sleeve is in the vertical position.

(m) The device includes a simple, durable pre-wired harness with secure barrel connectors that will accommodate excessive vibration during rides.

BRIEF DESCRIPTION OF DRAWING FIGS. 1 TO 45

FIG. 1—Safety sleeve/arm with LED strip lights and electrically actuated series 500 indexing mechanism on a tadpole style Trike.

FIG. 2—Safety sleeve/arm with LED strip lights and electrically actuated series 500 on a two-wheel bicycle.

FIG. 3—Plan view of electrically actuated series 500 with universal/interchangeable support spar arm.

FIG. 4—Plan view of hand operated (HO) manual series 300 indexing mechanism with spar arm.

FIG. 5—Plan view of the HO series 400 indexing mechanism with spar arm.

FIG. 6—Safety sleeve/arm with LED strip lights. Includes electrically actuated series 500 on a two-wheel bicycle, with European conversion option.

FIG. 7—Plan view of electrically actuated series 500 with European conversion option.

FIG. 8—Displays a plan view of the HO series 400 with European conversion option.

FIG. 9—Safety sleeve/arm with LED strip lights. Includes electrically actuated series 500 on a tadpole style trike, along with the European conversion option.

FIG. 10—Plan view of electrically actuated series 500 with European conversion option.

FIG. 11—Plan view of the HO series 300 with European conversion option.

Figure 12:
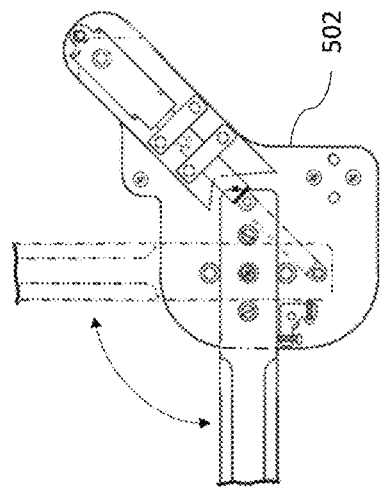

FIG. 12—Plan view of electrically actuated series 500 using base plate 502 model with common detent locations.

Figure 13:
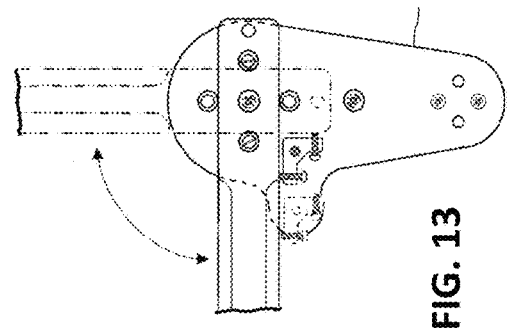

FIG. 13—Plan view of hand operated (HO) series 400 using base plate 402 model with common detent locations.

FIG. 14—Plan view of the HO series 300 using base plate 302 model with common detent locations.

Figure 15:
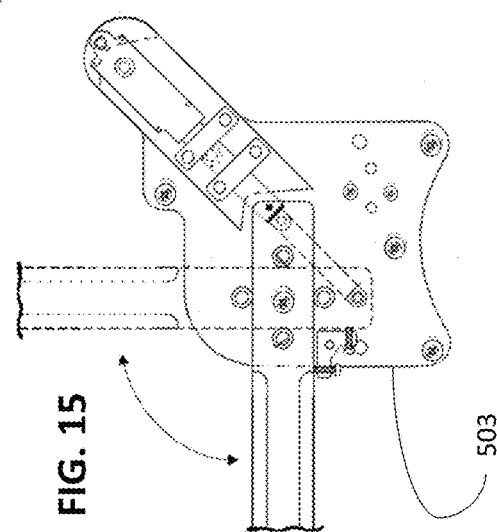

FIG. 15—Plan view of electrically actuated series 500 using the universal base plate 503 model with common detent locations.

Figure 16:
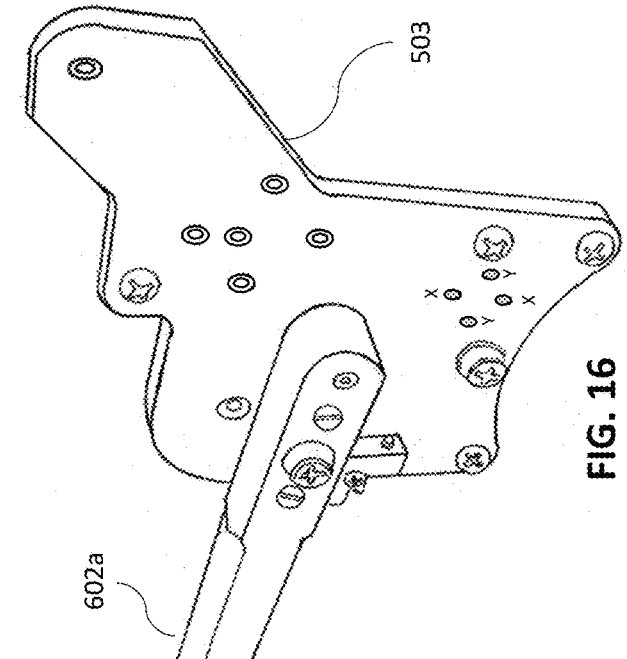

FIG. 16—Perspective view of the HO version of base plate 503, which replaces the other base plates 502, 402 and 302 previously shown.

FIG. 17—Plan view of universal series 500, with base plate 503 using an electrically actuated mechanism, with multiple mount configurations.

FIG. 18—Perspective assembly view of electrically actuated series 500 using universal 503 base plate, with spar arm.

Figure 19:
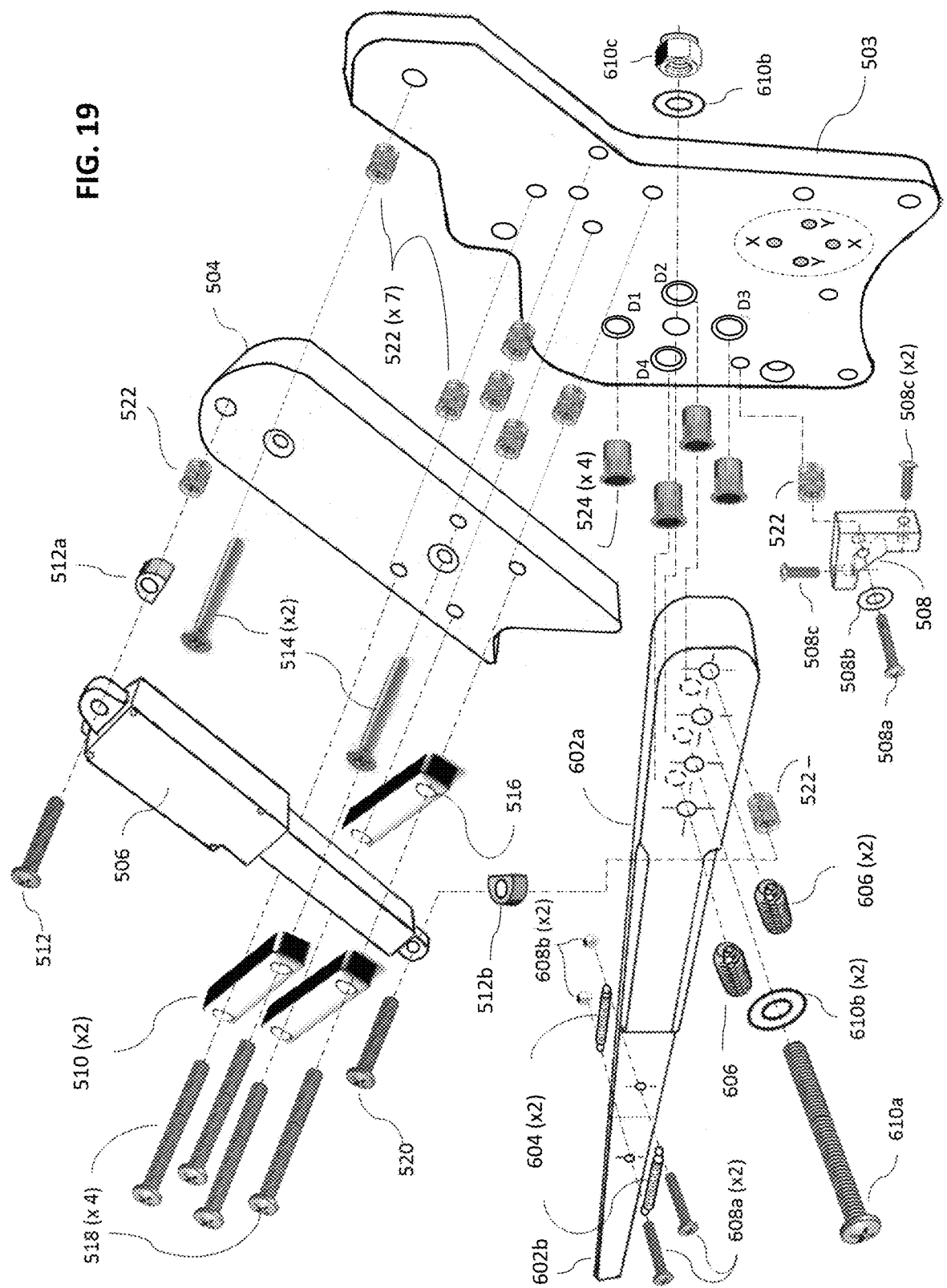

FIG. 19—Exploded view of electrically actuated series 500 using universal 503 base plate, with spar arm.

Figure 20:
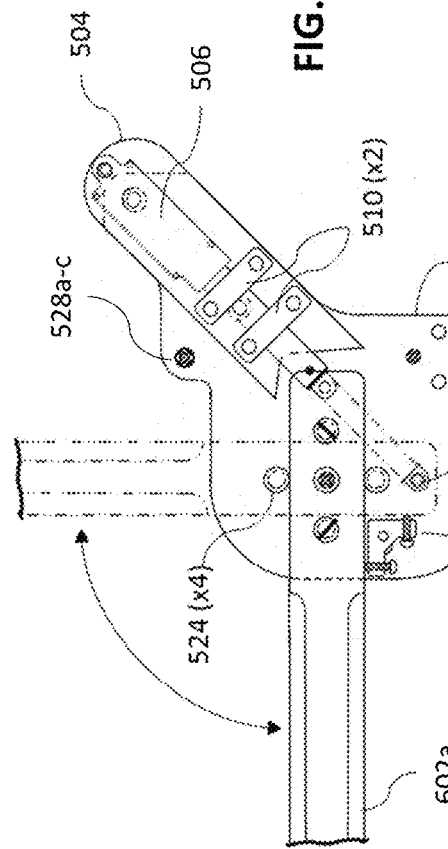

FIG. 20—Plan view of electrically actuated series 500 using the 502 base plate and spar arm.

Figure 21:
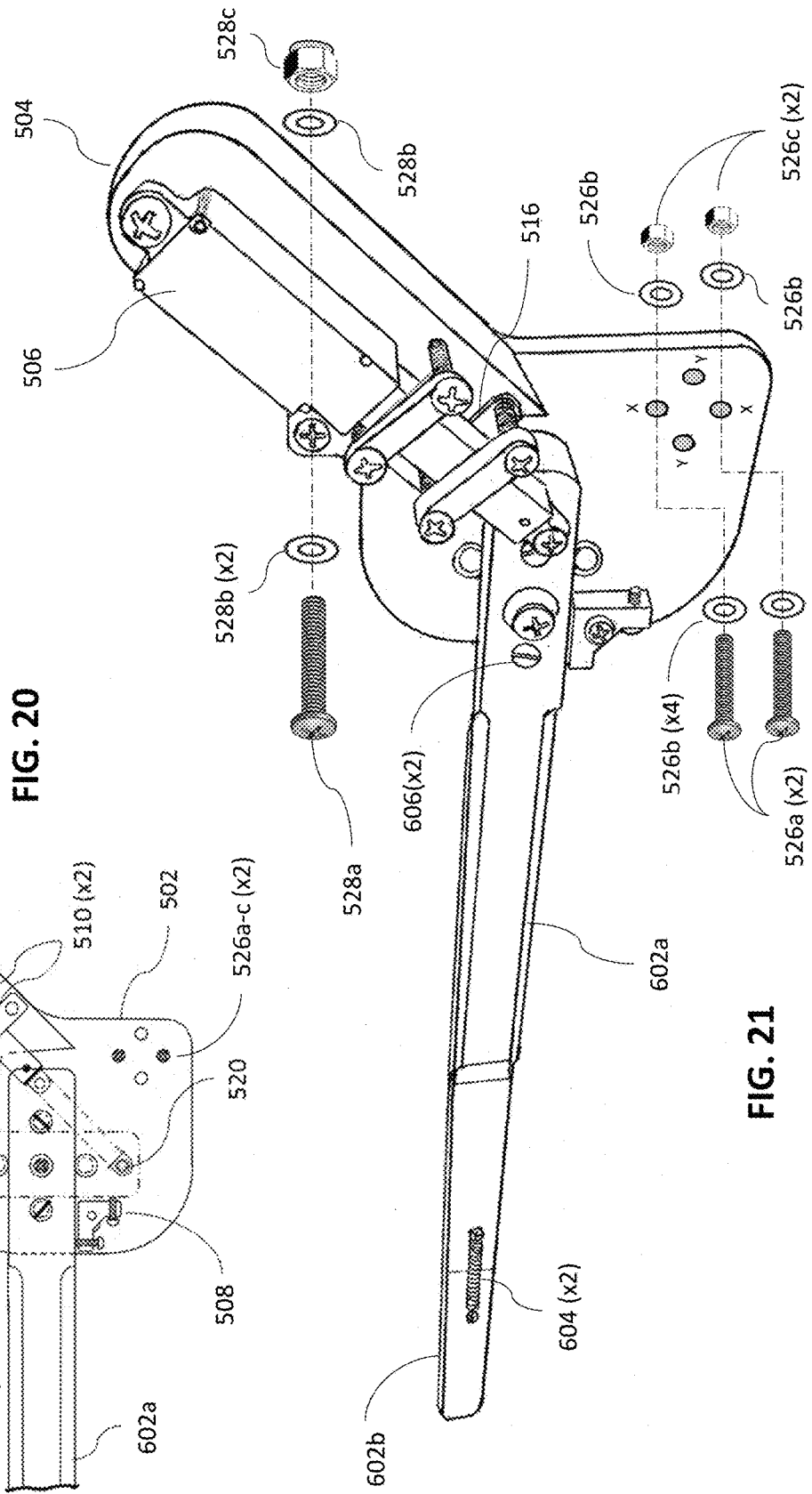

FIG. 21—Perspective assembly view of electrically actuated series 500 with base plate 502, spar arm and breakaway feature.

FIG. 22—Exploded view of electrically actuated series 500 with base plate 502 and spar arm.

FIG. 23A—Plan view of the HO actuated series 400 using base plate 402 with spar arm.

FIG. 23B—Side elevation view of HO actuated series 400 using base plate 402 with universal angle brackets.

FIG. 24—Perspective assembly view of HO actuated series 400 with base plate 402 and spar arm.

Figure 25:
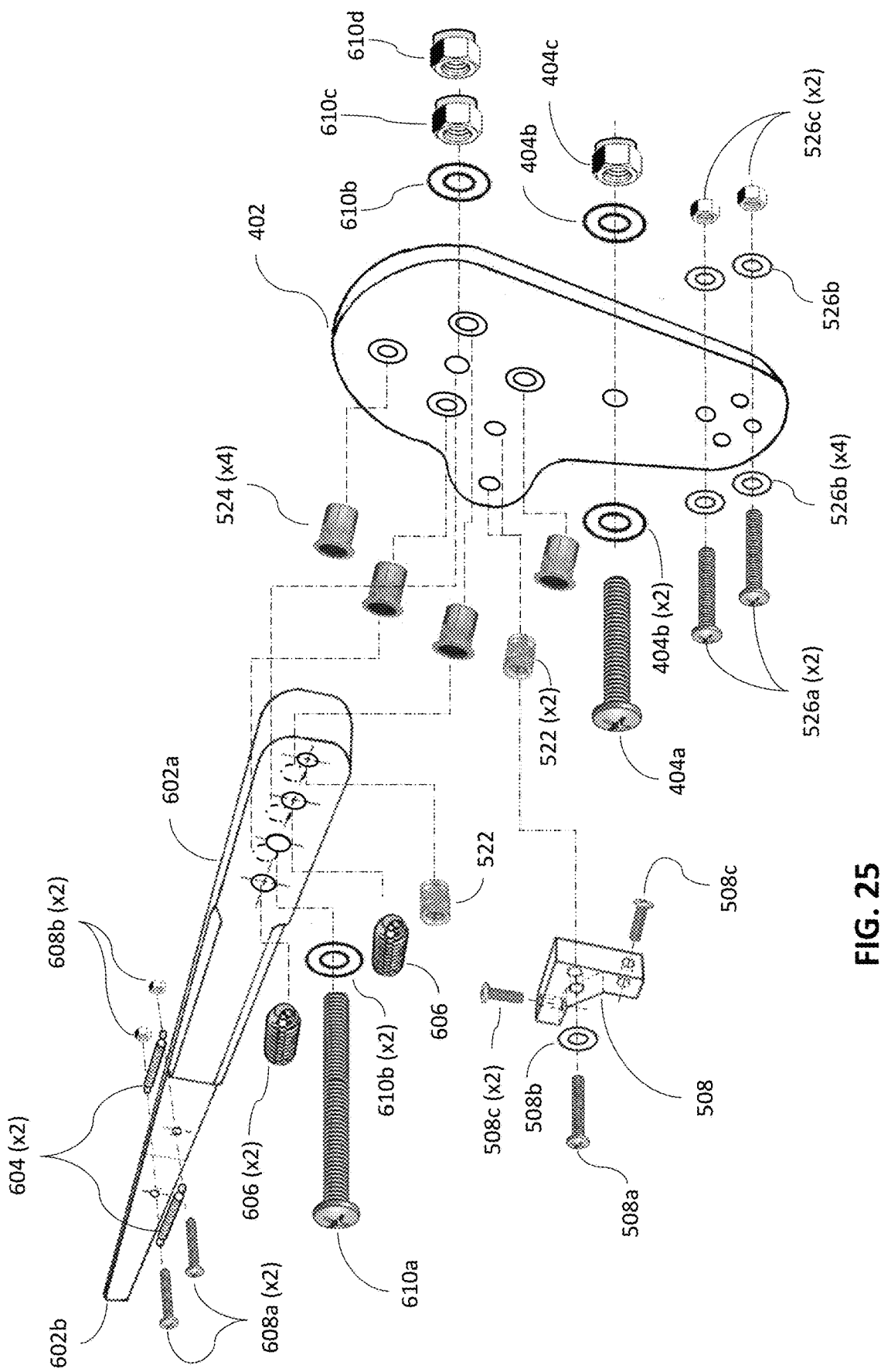

FIG. 25—Exploded view of HO actuated series 400 with base plate 402 and spar arm.

FIG. 26A—Plan view of HO actuated series 300 using base plate 302 and spar arm.

FIG. 26B—Side elevation view of HO actuated series 300 using the 302 base plate and spar arm.

FIG. 27—Perspective assembly view of HO actuated series 300, with the 302 base plate and spar arm.

Figure 28:
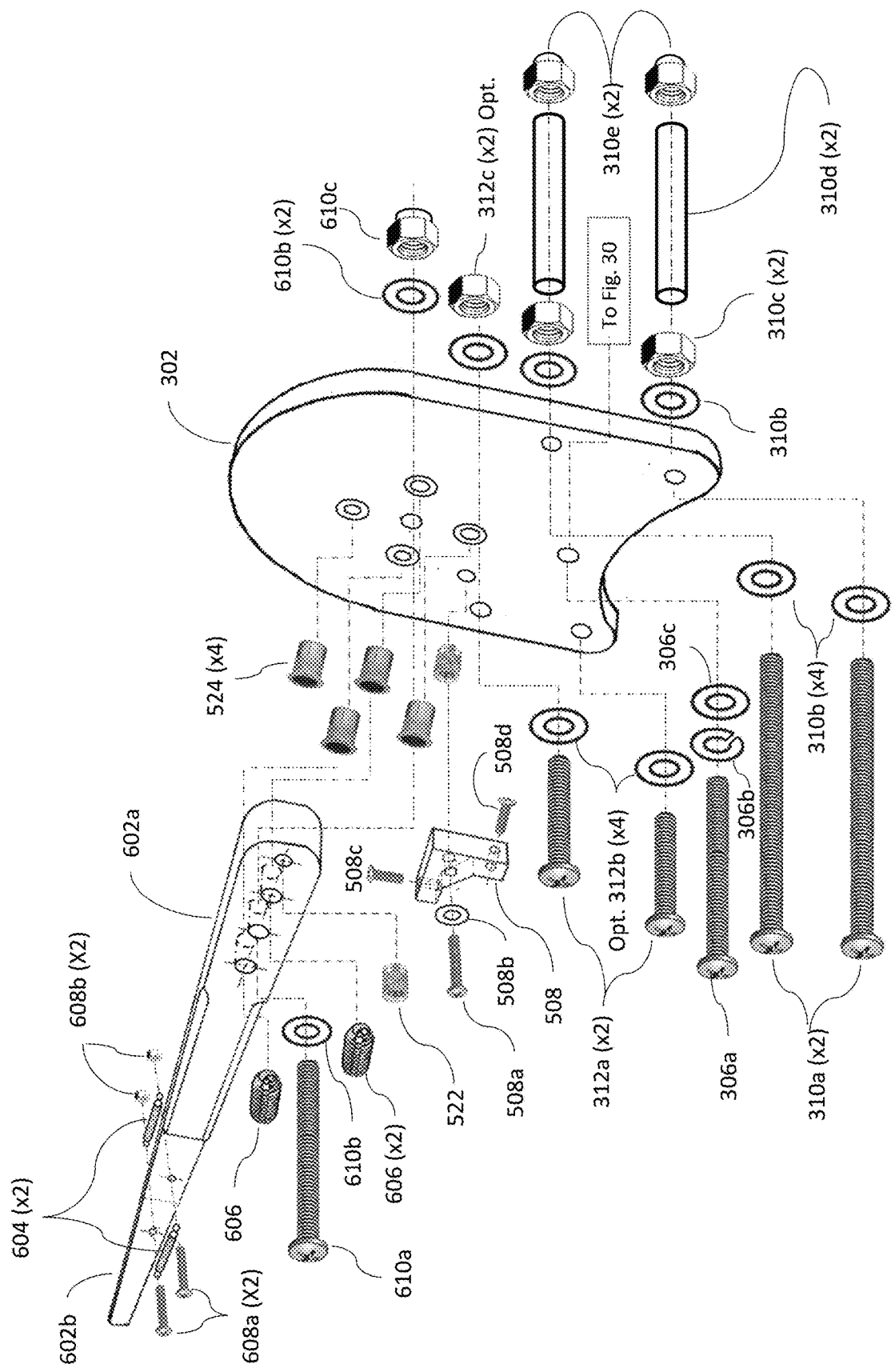

FIG. 28—Exploded view of HO actuated series 300 apparatus, with the 302 base plate and spar arm.

Figure 29:
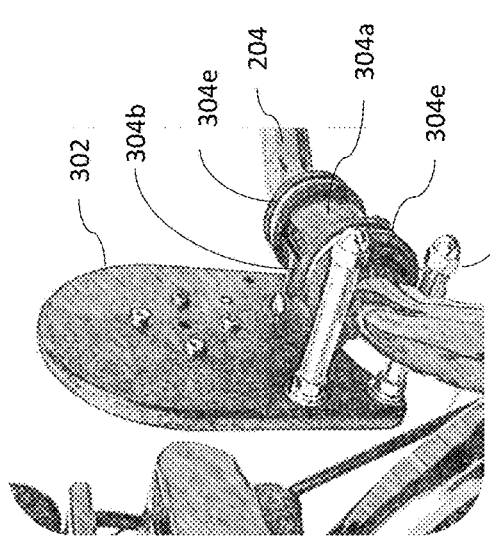

FIG. 29—Perspective view of series 300 with base plate 302 mounted on a horizontal section of a tadpole or delta trike tubular seat frame.

Figure 30:
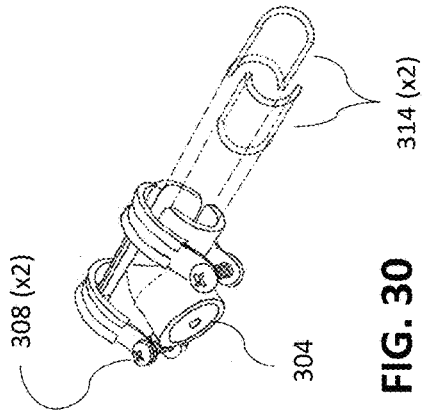

FIG. 30—Tee clamp mount assembly with protective rubber inserts.

Figure 31:
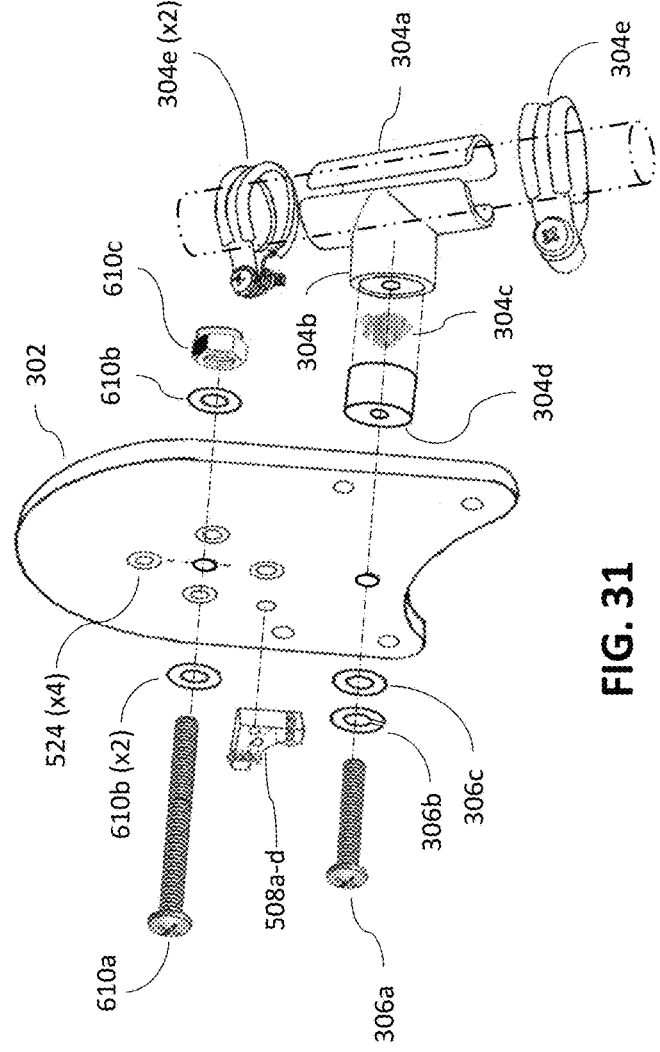

FIG. 31—Exploded view of fasteners used to mount series 300 apparatus to tee clamp assembly installed on horizontal frame section.

Figure 32:
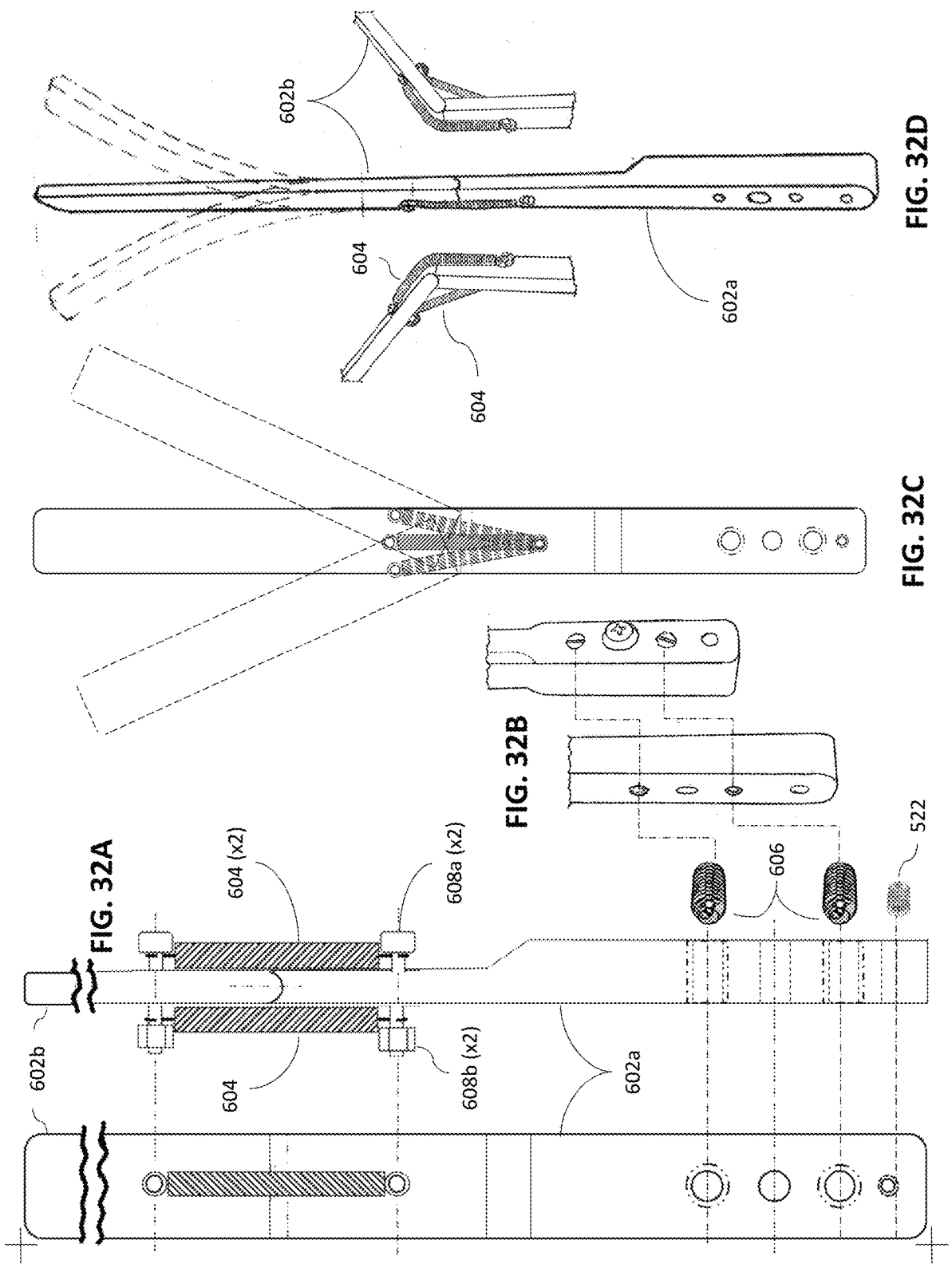

FIG. 32A—Plan and side elevation view of universal/interchangeable support spar arm with the breakaway hinge/dual spring return design.

FIG. 32B—Perspective view of pivotal spar end, with emphasis on ball plunger locators.

FIG. 32C—Shows plan view of spar arm lateral breakaway flexibility.

FIG. 32D—Perspective view of spar arm with breakaway joint, spring return design.

FIG. 33—Plan and elevation view of airfoil-shaped safety sleeve with LED Lights and reflective tape.

FIG. 34—Perspective view of airfoil-shaped safety sleeve, with spar arm inserted within the safety sleeve.

Figure 35A:
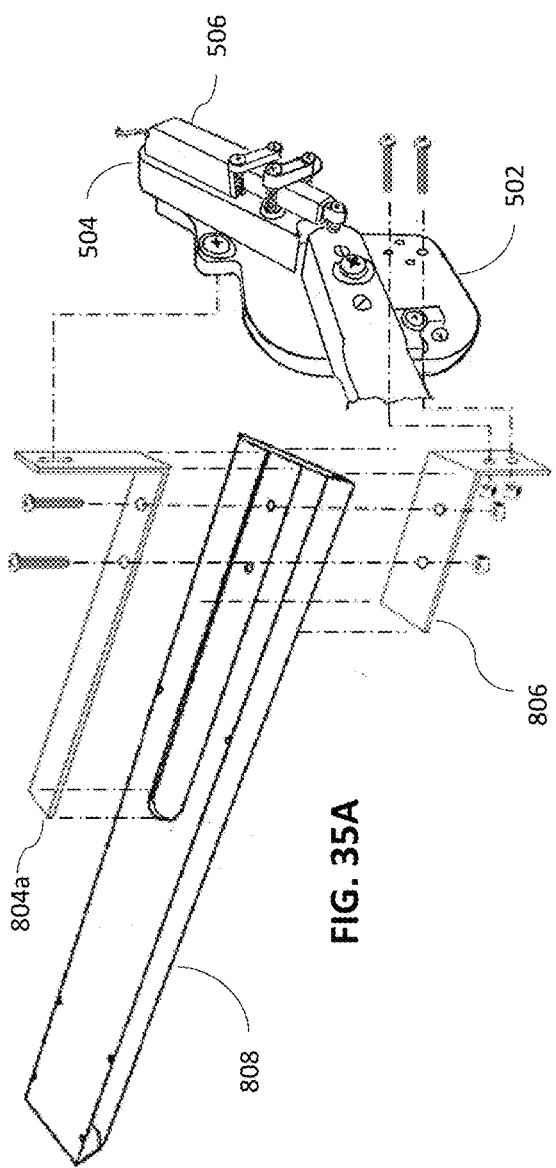

FIG. 35A—Exploded view of the typical track beam mount configuration with custom adaptor plate for the series 500 apparatus assembly.

Figure 35B:
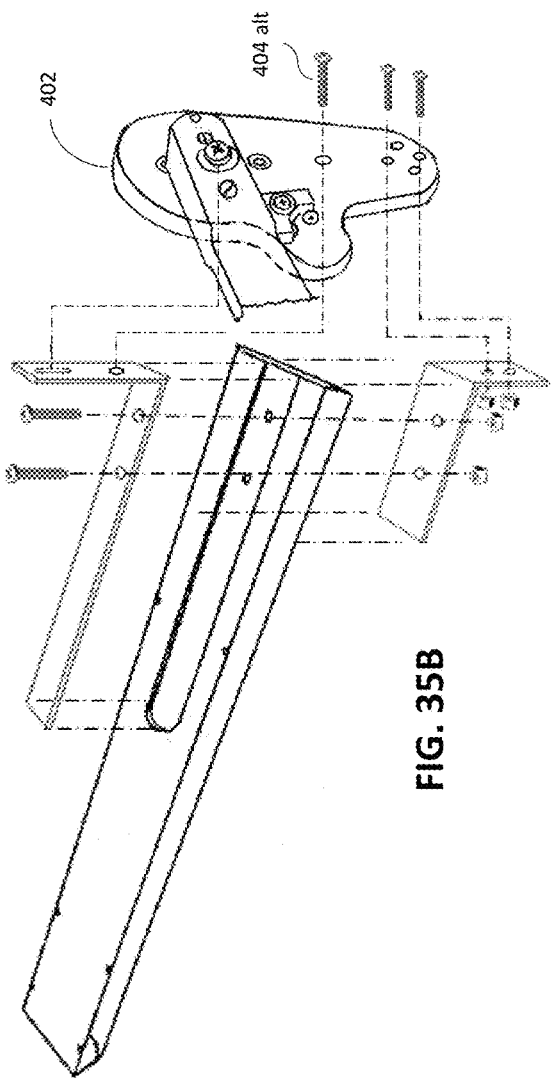

FIG. 35B—Exploded view of the typical track beam mount configuration with custom adaptor plate for series 400 apparatus assembly.

FIG. 36A—Perspective front view of series 500/502 assembly installed on a seat post track beam style bicycle rack.

FIG. 36B—Perspective rear view of series 500/502 mounted assembly.

FIG. 36C—Attachment procedure for an accessory trunk bag to a seat post track beam mount.

FIG. 37—Exploded view of how series 500/502 assembly components are attached to a typical track-beam seat post or rear luggage carrier rack.

Figure 38B:
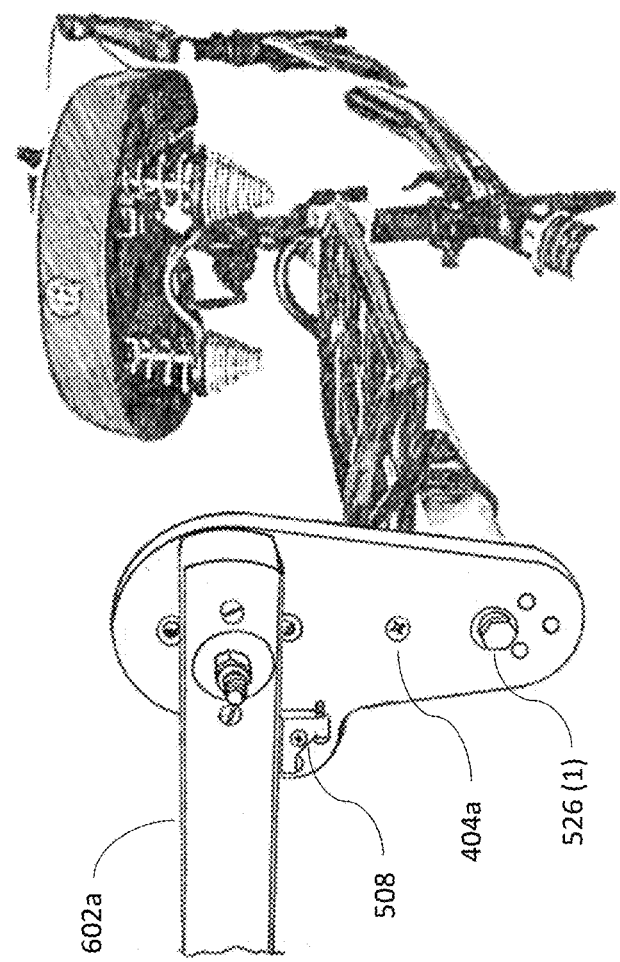
Figure 38A:
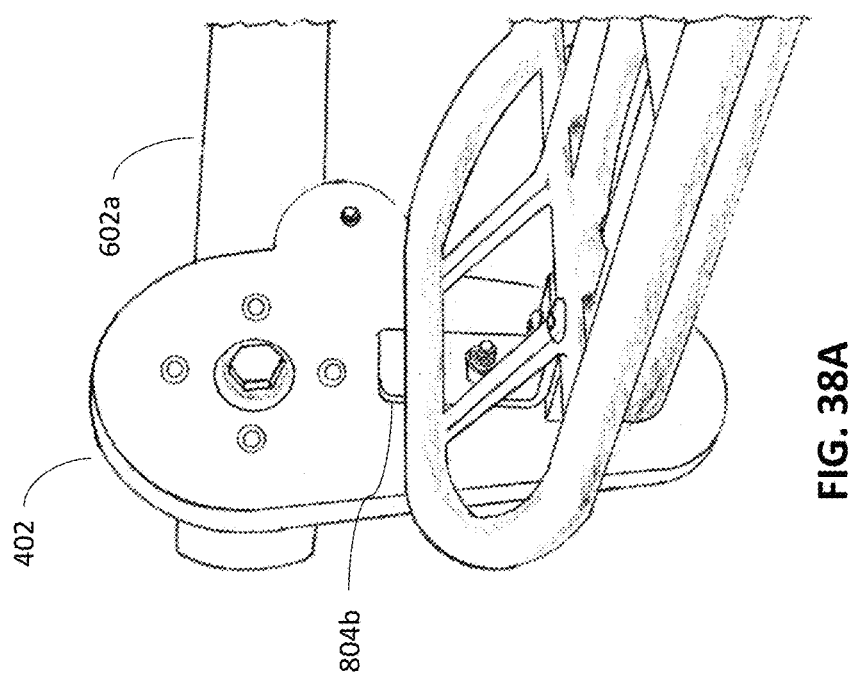

FIG. 38A—Front view of series 400 mount for a typical bicycle rack used for either a seat post, or rear trunk luggage carrier.

FIG. 38B—Rear view of series 400 mount for a typical bicycle rack used for a seat post, or rear luggage carrier rack.

Figure 39:
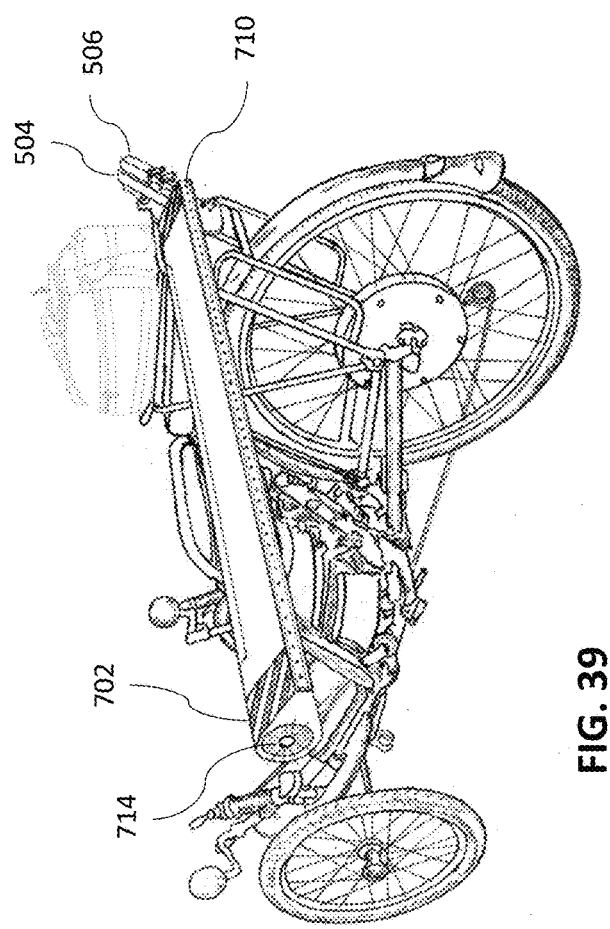

FIG. 39—Full image of tadpole style trike with series 500 electromechanical mechanism and safety sleeve/arm device, attached and placed in the active horizontal position.

Figure 40:
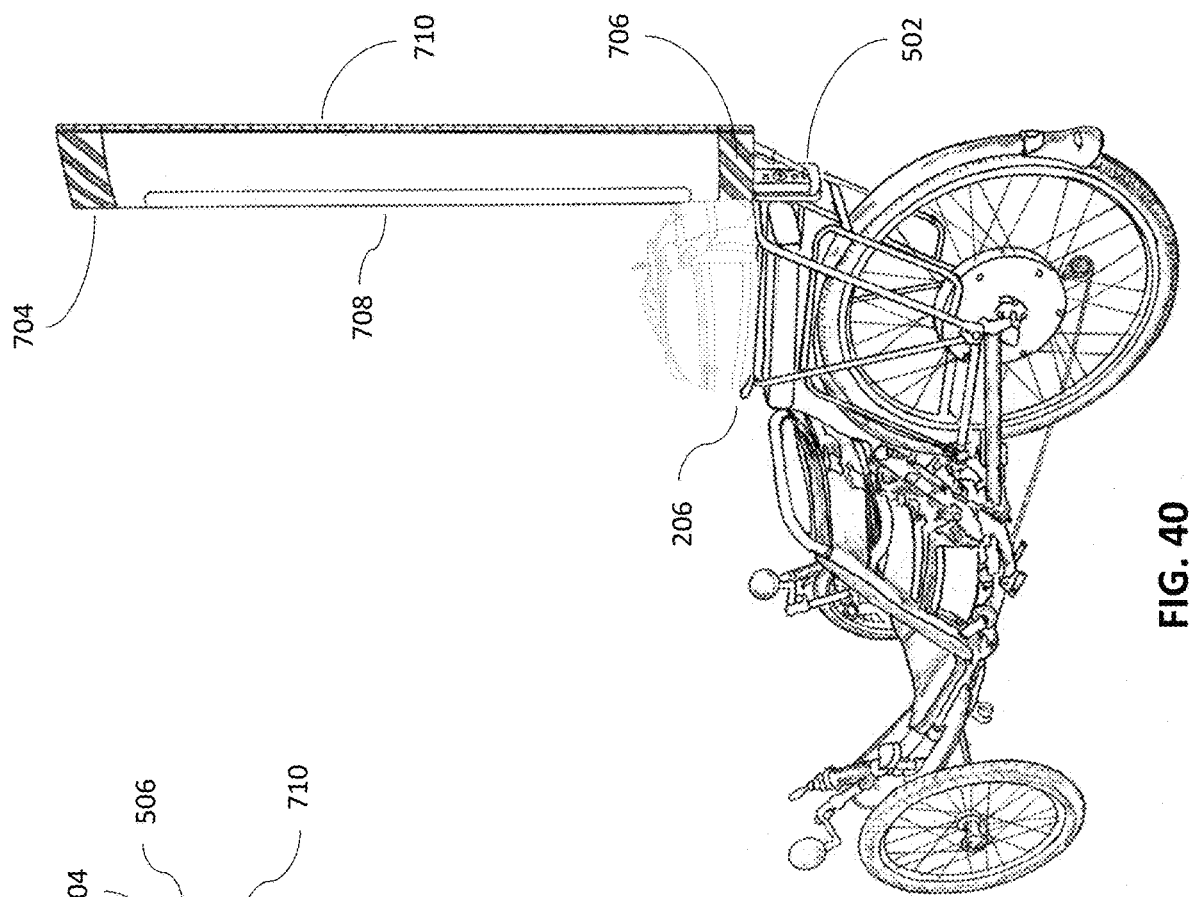

FIG. 40—Full image of tadpole style trike with series 500 electromechanical mechanism and safety sleeve/arm device, attached and placed in the stowed vertical position.

FIG. 41—Full image of tadpole style trike with series 300 model and safety sleeve/arm device attached to seat frame and placed in the active horizontal position.

FIG. 42—Full image of tadpole style trike with series 300 model and safety sleeve/arm device attached to seat frame and placed in the stowed vertical position.

Figure 43:
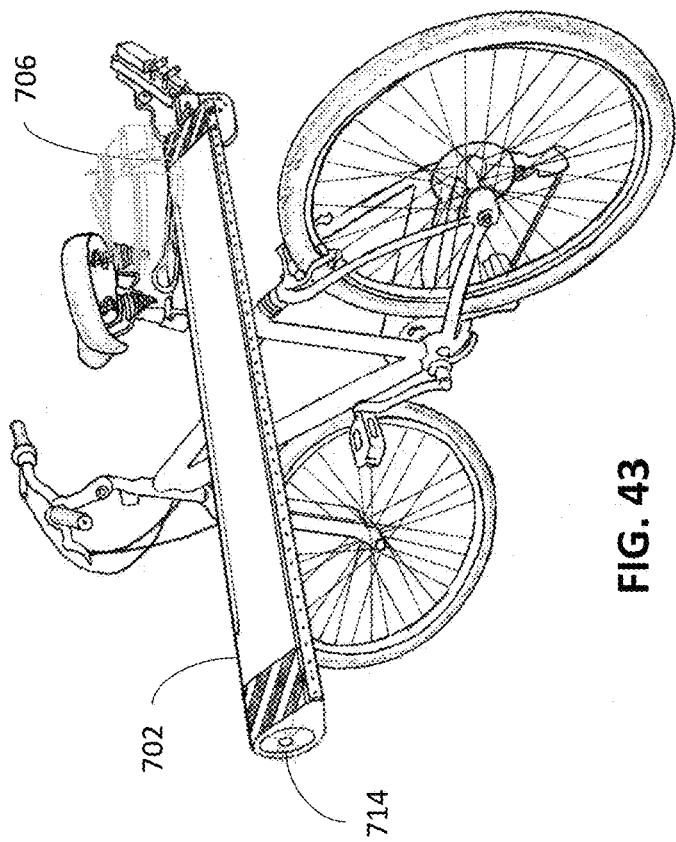

FIG. 43—Full image of a traditional bicycle with series 500 electromechanical mechanism and safety sleeve/arm device, attached and placed in the active horizontal position.

Figure 44:
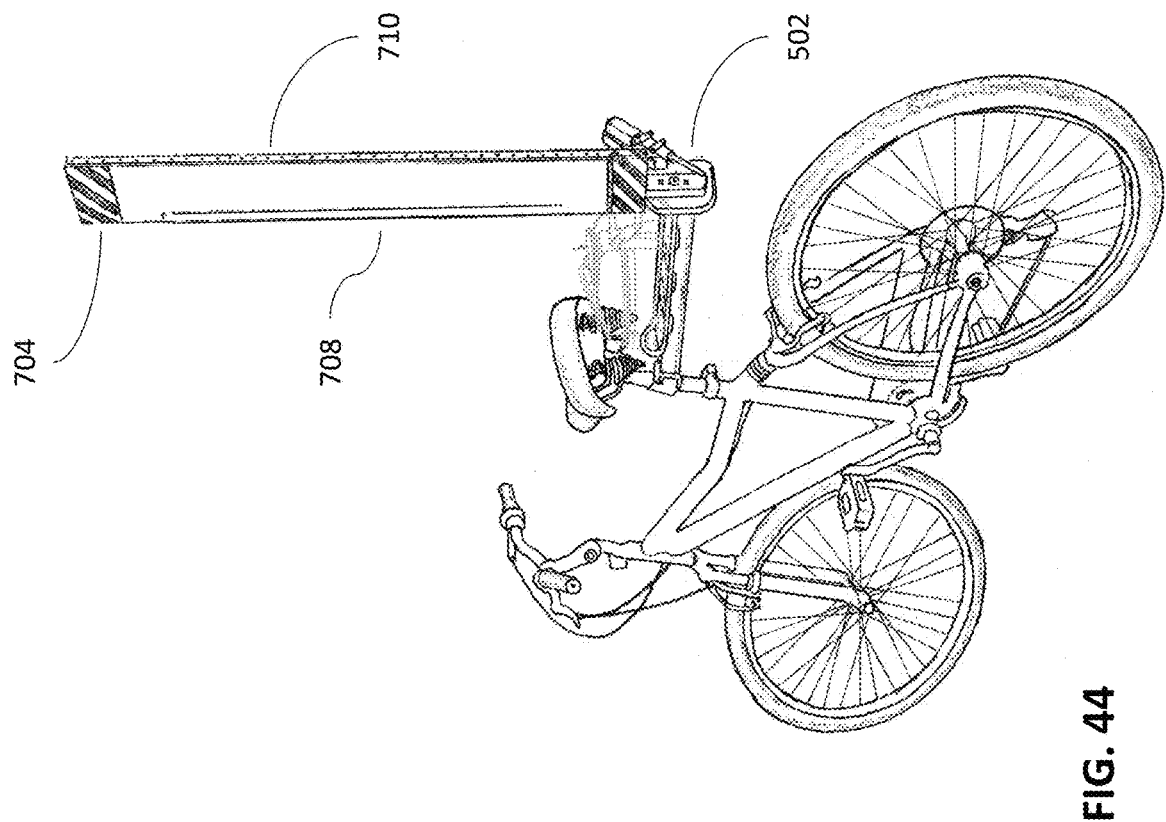

FIG. 44—Full image of a traditional bicycle with series 500 electromechanical mechanism and safety sleeve/arm device, attached and placed in the stowed vertical position.

Figure 45:
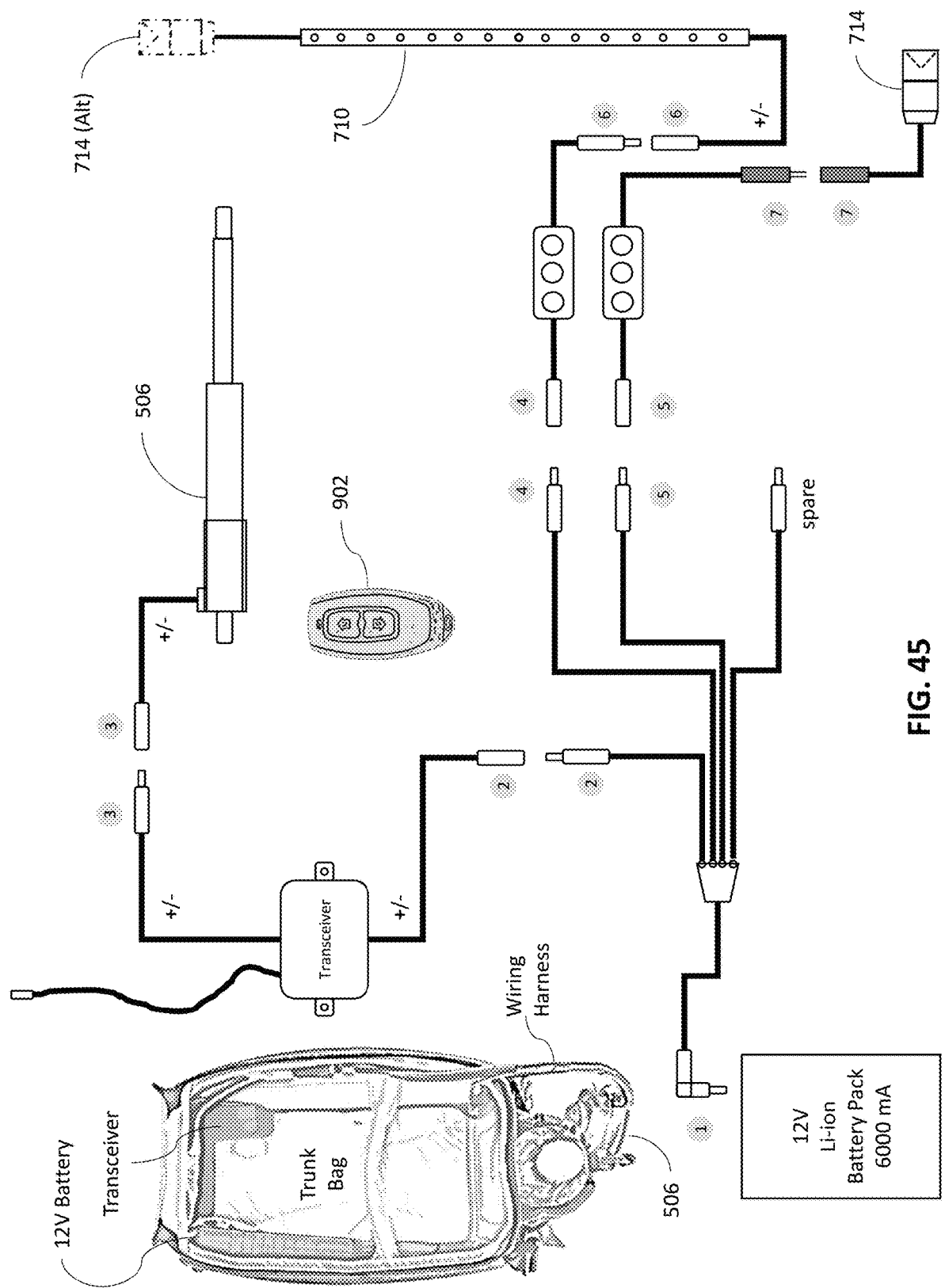

FIG. 45—Wiring diagram for semi-automatic electromechanical series 500 mechanisms.

DRAWINGS - REFERENCE NUMERALS - (Primary)

302 - base plate
304 - tee mount
402 - base plate
502 - base plate

DRAWINGS - REFERENCE NUMERALS - (Primary)

503 - base plate
504 - support riser
506 - electric actuator
508 - mechanical stop
602 - universal spar Arm
604 - breakaway springs
606 - ball plunger
702 - safety sleeve
704 - reflective tape
706 - reflective tape
708 - reflective tape
710 - LED strip lights
712 - reflective end cap
714 - LED wing tip light
804a - mount bracket
804b - mount bracket
806 - mount bracket
902 - wireless key fob DETAILED DESCRIPTION: FIGS. 1, 2, 3, 6, 7, 9, 10, 12, 15, 16, 17, 18, 19, 20, 21, 22, 32A-32C, 33, 34

FIG. 1—displays a rear elevation view of series 500 electromechanical actuator assembly installed on a three-wheeled tadpole style tricycle vehicle 202. A cross linked polyethylene (XLPE) foam safety sleeve 702, with ultra-bright LED strip lights 710 is installed on universal support spar arm 602. It shows safety sleeve 702 in two relative locations, horizontal (active) position and a vertical (stowed) position.

FIG. 2—displays a rear elevation view of series 500 electromechanical actuator. Assembly mounts to a typical seat post 104 beam rack, or bicycle/tricycle rear luggage rack accessory commonly installed on a traditional two-wheeled bicycle 102. Also shown is a XLPE foam safety sleeve 702, with ultra-bright LED strip lights 710 installed on universal support spar arm 602, displayed in two positions, horizontal (active) and vertical (stowed) position.

FIG. 3—shows a more detailed plan view of series 500 electromechanical actuator assembly. This includes primary base plate 502, electric actuator support riser 504 and electric linear actuator 506. These are connected to spar arm 602*a-d*, with an adjustable mechanical stop 508 strategically placed on base plate 502.

FIG. 6—shows series 500 device installed on a traditional bicycle 102, which displays a rear elevation view of series 500 electromechanical actuator assembly using base plate 502. This assembly mounts to a typical seat post 104 beam rack, or bicycle rear luggage carrier rack accessory. Also displayed is the XLPE foam safety sleeve 702, with ultra-bright LED strip lights 710, mounted on the spar arm 602*a-b*. It shows this in three relative locations, horizontal (active-left side) position, a vertical (stowed) position and horizontal (active-right side) position for European applications.

FIG. 7—shows a more detailed plan view of series 500 electromechanical actuator mechanism. This includes base plate 502, electric actuator support riser 504 and electric linear actuator 506. These are connected to spar arm 602*a-b*. Also shown in three locations, horizontal (active-left side) position, a vertical (stowed) position and horizontal (active-right side) position. An adjustable mechanical stop 508 is strategically located on base plate 502. Note the "European Design" (horizontal right-side active position) is a mirror image of the North American version. The ease of conversion is simple. All components supplied are the same for both North American and European applications, therefore, the user can make this change easily.

FIG. 9—displays series 500 rear elevation view. This includes the electromechanical mechanism mounted to a typical rear bike rack accessory 206 installed on tadpole style three-wheeled tricycle vehicle 202, (ref. FIG. 40). The XLPE foam safety sleeve 702, with ultra-bright LED strip lights 710 installed on spar arm 602, shown in three relative locations, horizontal (active-left side) position, a vertical (stowed) position and horizontal (active-right side) position.

FIG. 10—shows a more detailed plan view of series 500 electromechanical mechanism, which includes base plate 502, electric actuator support riser 504 and electric linear actuator 506, connected to the spar arm 602a-b. The adjustable mechanical stop 508 is strategically located and attached to base plate 502. The "European Design" (horizontal right-side active position) is a mirror image of the North American version. The ease of conversion is simple. Whereby, base plate 502 is flipped over and original components reattached. All components supplied are the same for both North American and European applications.

FIG. 12—shows assembly plan view for the electromechanical series 500 with 502 base plate.

FIG. 15—shows assembly plan view for the electromechanical universal series 500 with 503 base plate.

NOTE: Although the models presented in this application have different OD configurations, all models share the following common design parameters.

(a) All base plates 503, 502, 402 and 302 have the same identical index pattern 19 mm (0.75"), radius of travel off spar arm pivot bolt 610a centerline. This radial index pattern locates spar arm 602a-b into the horizontal (active) or vertical (stowed) positions.
(b) Spar Arm 602a-b is interchangeable between all models.
(c) The adjustable vertical and horizontal mechanical stop 508 with 508a-c hardware is interchangeable.
(d) Component related assembly and fastening of spar arm 602a-b to base plates are identical.
(e) Mount hole locations for installing the assemblies onto a traditional seat post beam mount, or bicycle rear luggage carrier rack use the same dimensional pattern. (Series 300 is the only exception)
(f) Series 500 models, with base plates (503 & 502) can perform as a hand operated, or electromechanically actuated system, as shown in previous embodiments.

FIG. 16—displays a perspective view of series 500 manual model that uses universal base plate 503. Users that prefer starting with a manual system to determine the effectiveness of the device, can mount base plate 503 at any of the locations previously discussed. To upgrade from the manual HO device to the electromechanical actuated system, the remaining components required comprise the following . . . (1) Actuator riser mount 504, (1) electric linear actuator 506, (1) electrical wiring harness FIG. 45, and associated hardware, as shown in embodiment FIG. 19

FIG. 17—shows a more detailed plan view of the universal series 500 assembly using base plate 503, which has a slight OD variation compared to base plate 502. This is because base plate 503 is capable of replacing all previous mount configurations needed to install devices on a bicycle, or a three wheeled trike vehicle. Although base plate 503 has a slightly different outline, the dimensions of the internal indexing mechanism and components used for this apparatus is identical to all other models previously shown and described.

Spar arm 602a-b attaches to base plate 503 in such a manner to be secure, yet can rotate at the center bolt pivotal connection. Additional assembly includes attaching actuator support riser 504 to base plate 503, then securing actuator 506 to support riser 504 at the pivotal fixed end of actuator body. Followed by securing the clevis end of actuator push rod to spar arm 602a. Because of the slight radius of axis that develops during the 50 mm (2") stroke of actuator 506, a slight lateral back-and-forth travel of the actuator body occurs during operation. Therefore, actuator 506 is contained by placing two (2) keeper bridge pieces 510 over the top of shaft housing, along with one (1) support spacer 516 under the shaft housing. These are used to restrict any upward or downward movement of the actuator body and shaft housing during operation, yet allows the actuator the freedom to move laterally.

FIG. 18—is a perspective view of series 500/503 universal base plate assembly, which displays the spar arm 602a-b with the dual spring breakaway feature. Note, the X-X & Y-Y bolt pattern shown on base plates 503, 502, and 402 are identical and designed to match a common bolt pattern used by bike rack manufactures for rear reflector mounts. Typically one (1) or two (2) fasteners 526 will secure the bottom of series 400 or 500 base plates to a reflector bracket. These reflector brackets are commonly supplied with a seat post or rear bicycle luggage rack. This embodiment also shows the various fasteners and the locations that offer the user alternate possibilities to install series 500/503 assembly. Fasteners 306 and 310 are used to mount base plate 503 assembly to a horizontal tubular frame member. Whereas universal angle brackets 804 and 806, (ref. FIG. 23B), are attached using fasteners, 526a-c and 528a-c.

Universal angle brackets 804 and 806 allow mounting of series 400 and series 500 assemblies to a typical bicycle seat post beam rack, or rear luggage carrier rack (ref. FIG. 35 to 40).

FIG. 19—this embodiment is an exploded view of series 500/503 assembly parts and components. The fabricated components for base plate 503, actuator support riser 504, spar arm 602a-b and mechanical stop 508 assembly are all made of HDPE (high density polyethylene) lightweight, very durable material, with approximate dimensions of 9 mm (⅜") & 19 mm (¾") thick. This HDPE material is best suited for harsh sun and tough marine applications, for it will not rot, swell, splinter or delaminate when exposed to humidity or water. Although this special HDPE material appears best suited for all fabricated embodiments presented, other plastic, composite or metal materials are satisfactory.

Base plate 503 will have seven (7) non-ferrous threaded metal inserts 522 installed as shown. To reinforce the four (4) detent points (D1, D2, D3 & D4), on a 19 mm (0.75") radius, four (4) rivet style inserts 524 are installed. Once assembled, these detent locations in base plate 503 will dimensionally mate with the threaded ball plungers 606 installed in the spar arm 602a on about a 19 mm (0.75") radius off centerline of pivot bolt 610a.

Support riser 504 attaches to base plate 503 using fasteners 514, followed with the installation of actuator 506 on support riser 504, using fastener 512 with spacer 512a at the pivotal end of actuator. Two (2) keeper bridge pieces 510 are secured over the top of shaft housing, along with one (1) support spacer 516 under the shaft housing. These keeper pieces and spacer are lightly snug fit in place using four (4) fasteners 518. Then fastener 520 with spacer 512b secures the clevis end of moveable push rod shaft to the spar arm 602a.

Spar arm 602*a* and 602*b* are two fabricated HDPE pieces sized and shaped to snuggly fit into the longitudinal through hole of the airfoil safety sleeve arm 702. At approximately the center-point of spar arm, there is a pivoting joint with two (2) springs 604 under tension and secured with two (2) fasteners 608*a*, 608*b*. One (1) threaded insert 522 is installed at pivotal end of spar arm 602*a* to receive actuator 506 clevis push rod shaft end, which is secured with fastener 520 and spacer 512*b*. Ball plungers 606 are installed to a predetermined depth into the drilled and tapped holes in spar arm 602*a*. This procedure ensures a positive seating of the spar arm will occur when mated with the detent locations on base plate 503. The design allows the user to make finite adjustments to balance the force of this connection between spar arm 602 and base plate 503. This is accomplished by tightening or loosening the pivotal bolt hardware 610*a-c* and balance this action against the depth of ball plungers 606, related to the power curve of actuator 506.

Last step is to secure mechanical stop 508, with associated hardware 508*a-c*, to base plate 503. Once mechanical stop hardware with jack bolts 508*c* are installed, final vertical and horizontal alignment of spar arm 602/safety sleeve assembly 702 can be completed. As previously stated, the X-X & Y-Y bolt pattern shown at the bottom right side of base plate is typical on models 503, 502, and 402. They are identical and designed to match the common bolt pattern that bike rack manufactures use for rear reflector mounts.

FIG. 20—shows a more detailed plan view of series 500/502 assembly. Although base plate 502 has a distinct outline, the dimensions of the internal indexing mechanisms and components used for this apparatus is identical to all other models previously shown and described.

Spar arm 602*a-b* attaches to base plate 502 in such a manner to be secure, yet can rotate at the center bolt pivotal connection. Additional assembly includes attaching actuator support riser 504 to base plate 502. Then secure actuator 506 to the actuator support riser 504 at the fixed base, pivotal body end of actuator. Followed by securing the actuator push rod clevis end to spar arm 602*a*. Because of the slight radius of axis that develops during the 50 mm (2") stroke of actuator 506, a slight lateral back-and-forth travel of the actuator body occurs during operation. Therefore, actuator 506 is contained by placing two (2) keeper bridge pieces 510 over the top of shaft housing, along with one (1) support spacer 516 under the shaft housing. These are used to restrict any upward or downward movement of the actuator body and shaft housing during operation, yet not impede lateral movement of actuator 506.

FIG. 21—is a perspective view of series 500/502 universal base plate assembly, which displays the spar arm 602*a-b* with the dual spring breakaway feature. Note, the X-X & Y-Y bolt pattern shown on base plates 503, 502, and 402 are identical and designed to match a common bolt pattern used by bike rack manufactures for rear reflector mounts. Typically one (1) or two (2) fasteners 526 will secure the bottom of series 400 or 500 base plates to a reflector bracket. These reflector brackets are commonly supplied with a seat post or rear bicycle luggage rack. This embodiment also shows the various fasteners and the locations that offer the user alternate possibilities to install series 500/502 assembly using universal angle brackets 804 and 806, (ref. FIG. 23B), which are attached using fasteners, 526*a-c* and 528*a-c*.

Universal angle brackets 804 and 806 allow mounting of series 400 and series 500 assemblies to a typical bicycle seat post beam rack, or rear luggage carrier rack (ref. FIG. 35 to 40).

FIG. 22—this embodiment is an exploded view of series 500/502 assembly parts and components. The fabricated components include base plate 502, support riser 504, spar arm 602*a-b* and mechanical stop 508 assembly are all made of an HDPE (high density polyethylene) lightweight, but very durable material. Although the HDPE material appears best suited for all the fabricated embodiments presented, other plastic, composite or metal materials are satisfactory. Base plate 502 will have seven (7) non-ferrous threaded metal inserts 522 installed as shown. To reinforce the four (4) detent points (D1, D2, D3 & D4), on a 19 mm (0.75") radius, four (4) rivet style inserts 524 are installed. Once assembled, these detent locations in base plate 502 will dimensionally align with ball plungers 606 as installed in the spar arm 602*a* on about a 19 mm (0.75") radius off centerline of pivot bolt 610*a*. Support riser 504 bolts to base plate 502 using fasteners 514, followed with the installation of actuator 506 on support riser 504, using fastener 512 with spacer 512*a* at the pivotal end of actuator. Two (2) keeper bridge pieces 510 are secured over the top of shaft housing, along with one (1) support spacer 516 under the shaft housing. These keeper pieces and spacer are lightly snug fit in place using four (4) fasteners 518. Then fastener 520 with spacer 512*b* secures the clevis end of moveable push rod shaft to spar arm 602*a*.

Spar arm 602*a* and 602*b* are two fabricated HDPE pieces sized and shaped to snuggly fit into the longitudinal through-hole of safety sleeve 702. At approximately the center-point of spar arm, there is a pivoting joint with two (2) springs 604 under tension and secured with two (2) fasteners 608*a*, 608*b*. One (1) threaded insert 522 is installed at pivotal end of spar arm 602*a* to receive actuator 506 clevis end of push rod, which is secured with fastener 520 and spacer 512*b*. Ball plungers 606 are installed to a predetermined depth into the drilled and tapped holes in the spar arm 602*a*. This procedure ensures a positive seating of the spar arm will occur when mated with the detent locations on base plate 502. The design allows the user to make finite adjustments to balance the force of this connection between the spar arm 602 and base plate 502. This is accomplished by tightening or loosening the pivotal bolt hardware 610*a-c* and balance this action against the depth of ball plungers 606, related to the power curve of actuator 506. Last step is to secure mechanical stop 508, with associated hardware 508*a-c*, to base plate 502. Once mechanical stop jack bolts 508*c* components are installed, final vertical and horizontal alignment of spar arm 602/safety sleeve assembly 702 can be completed. As previously noted, the X-X & Y-Y bolt pattern shown at the bottom right side of base plate is typical on models 503, 502, and 402. They are identical and designed to match the common bolt pattern that bike rack manufactures use for rear reflector mounts.

FIG. 32A—shows a plan view and side elevation view of the interchangeable spar arm 602*a* and 602*b*, fabricated in two (2) pieces, sized and shaped to fit into the longitudinal through-hole of the airfoil safety sleeve arm 702. The spar arm is approximately 10 mm-19 mm (0.375"-0.75) thick×25 mm (1") wide×610 mm-711 mm (24"-28") long. At approximately the center-point of spar arm 602*a-b*, there is a pivoting joint with two (2) springs 604, both under tension and secured with two (2) fasteners 608*a*, 608*b*. One (1) threaded insert 522 is installed at the pivoting, bottom end of the spar arm 602*a*, allowing actuator 506 push rod clevis to connect with spar arm using fastener 520.

FIG. 32B displays two (2) ball plungers 606 installed to a predetermined depth into the drilled and tapped holes within spar arm 602*a*. This process will allow for positive seating of spar arm 602a when mated with detent locations in base plates 503, 502, 402 and 302.

FIG. 32C—shows a plan view of spar arm 602a-b, with breakaway joint concept using containment springs 604 under tension that act like ligaments to hold the two (2) support spar arm sections together. This breakaway arm design not only allows travel in two directions following the radial axis of the fabricated joint shown, but it also allows the upper arm to pivot laterally.

FIG. 32D—displays an approximation of the inherent resiliency of the HDPE material used to fabricate spar arm 602a-b, which offers an additional measure of stress relief from sudden impacts. Considering the materials used, coupled with the dual spring breakaway feature, spar arm 602a-b can withstand an impact from any direction and will thus help absorb and deflect the force of an impact away from the cyclist.

FIG. 33—represents the low density foam XLPE (cross-linked polyethylene) airfoil shaped safety sleeve 702, with an internal 25 mm (1") diameter hole extending through the full length of the member. The overall length of safety sleeve 702 is approximately 610 mm-914 mm (24"-36"). Although the sleeve material selected is a lightweight XLPE material, other materials, shapes and sizes may be considered satisfactory. For increased visibility, reflective material 704 and 706 is wrapped around the top and bottom base ends of safety sleeve 702. Also, a reflective strip 708, approximately 50 mm (2") wide×610 mm (24") long is attached to the front (leading edge) of safety sleeve 702. These reflective tape additions further enhance nighttime visibility of the safety sleeve/arm to vehicles approaching the cyclist from the front. A set of 12V-24V low voltage LED ultra-bright strip lights 710 are installed full length on trailing edge. Also mounted on the very top end of sleeve 702 is a reflective material end cap 712, along with a single low voltage LED wing tip light 714 that will protrude into the lane, which further draws attention to the cyclist's safe zone of travel.

FIG. 34—is the perspective view of safety sleeve 702 with spar arm 602a-b sections sized and shaped to fit snuggly into the sleeve's ID longitudinal through through-hole. Safety sleeve 702 dimensions are, but not limited to, approximately 45 mm (1.50") radius at the leading edge, a 19 mm (¾") deep trailing edge, having a 114 mm (4.50") profile width× 762 mm (30") to 914 mm (36") overall length. The safety sleeve 702 is also removable, portable and interchangeable with all model series presented.

Operation: FIGS. 1, 2, 3, 6, 7, 9, 10, 12, 15, 16, 17, 18, 19, 20, 21, 22, 32, 33 & 34

The indexing system of all model series comprises up to four (4) fabricated component sections made of structurally sturdy material, which can be a high density polyethylene (HDPE), composite, or metal material. All base plate models have predetermined detent locations to receive the head(s) of the ball plunger locaters. A ball plunger is a spring-loaded ball tipped component, which places the ball under pressure from an internal compression spring within the housing of the ball plunger. These ball tipped locaters are installed in the pivotal end of spar arm. As the spar arm rotates to a vertical stowed, or horizontal active position, positive seating of the ball plungers into the base plate detents at each location is required for successful operation. This is accomplished by compressing the pivotal end of the support spar arm against base plate, using a fastener bolt with a locknut. Tightening or loosening of this fastener provides infinite control over the degree compressive strength that is needed to engage the ball plungers into the base plate. Too much pressure will create a binding action, whereas too little pressure causes the spar arm/sleeve to wobble. Therefore, the goal is to achieve a balance between properly engaging the ball locators to firmly seat the arm into the base plate, with just enough pressure to maintain stability, but not cause any binding between the two pieces. Once proper compression/tension adjustments are complete, the system can be actuated manually or electrically to move the spar arm into the vertical, or horizontal detent locations in base plate. Using the mechanical stop jack bolts, final vertical and horizontal alignment of the spar arm/safety sleeve can be achieved.

The semi-automatic electrically actuated mechanism is a unique design feature of series 500 models. This feature allows the cyclist to perform all spar arm/safety sleeve actions using a direct wired or wireless remote key fob and latching relay contacts to control the movements of the electric linear actuator. During a ride, the cyclist can move spar arm/safety sleeve with a push of an up/down button on the key fob. For ease of recognition, the key fob buttons have directional arrow symbols. Once the key fob is actuated, the spar arm/safety sleeve will automatically seek the selected location. When the actuator push rod reaches either the fully retracted or fully extended stroke, the actuator's internal limits will trigger the relay to disconnect the power supply. This all happens simultaneously as spar arm settles into the base plate detent(s) aligned with the selected position. A cyclist will find this a very convenient and a much safer way to actuate spar arm/safety sleeve while the pedal vehicle is in motion.

At present, it appears the Series 500 models are the most effective and efficient. However, the other hand operated systems discussed (series 300 and 400) are satisfactory.

The airfoil shaped safety sleeve is designed to slide over the support spar arm. Because the spar arm is slightly larger than the longitudinal through-hole diameter of the foam safety sleeve, it will fit snuggly and securely inside the sleeve. The spar arm is interchangeable between all base plate designs used for series 300, 400 or 500 models. The slim design of the spar arm also enhances flexibility because of the inherent resiliency of the high density HDPE polyethylene material. However, the spar arm dual spring breakaway feature also allows this safety arm to withstand a significant impact from any direction. Because of the inherent resiliency of the materials used, coupled with the breakaway spring design, makes this spar arm/safety sleeve a very rugged and robust device.

The XLPE low density foam selected for the safety sleeve is a very lightweight, flexible and non-abrasive material. Therefore, if the sleeve contacts an object, or an object strikes the foam sleeve, the object and/or the sleeve would exhibit limited to no damage. Because yellow is the first color the human eye recognizes, the brilliant yellow color was selected for the safety sleeve, but other colors and materials are also suitable.

To add another level of visibility, the ultra-brilliant LED strip lighting installed on the trailing edge of the airfoil sleeve, along with a wing tip LED light, creates a very visible elongated object seen from a considerable distance day or night. The LED strip lights and wing tip light include a separate control for light intensity and pulse mode. This provides the operator the ability to vary the frequency of light pulsations, thus improving the objects visibility to approaching motorists.

Installation of the safety distance device is simple. There are various mount concepts discussed and displayed herein for the mechanical indexing mechanisms, yet are not limited to the shapes and sizes shown. These mount configurations adapt to a vast majority of bike/trike frames and/or rear luggage carrier rack designs.

Additional Embodiments: FIGS. 35 to 45

FIG. 35A—displays the exploded view of the typical track beam mount configuration for series 500 apparatus assemblies. Also shown is the custom adaptor plate 808 with universal angle brackets 804 and 806.

FIG. 35B—displays the exploded view of the typical track beam mount configuration for series 400 apparatus assembly.

FIG. 36A—shows the installed backside perspective view of series 500/502 assembly on a seat post track beam style bicycle rack.

FIG. 36B—displays a rear perspective view of series 500/502 mounted assembly.

FIG. 36C—is the attachment procedure for an accessory trunk bag to a seat post track beam mount. This configuration also applies to a track beam mount used for a rear trunk luggage carrier rack.

FIG. 37—provides an exploded view of series 500/502 assembly components used to attach the apparatus to a typical track-beam seat post mount.

FIGS. 38A & 38B—shows a front and rear view of mounting technique for a typical seat post luggage carrier rack.

FIG. 39—displays a full image of tadpole style trike having series 500 electromechanical mechanism installed, with safety sleeve/arm device attached and placed in the active horizontal position.

FIG. 40—shows the full image of a tadpole style trike having series 500 electromechanical mechanism installed. The safety sleeve/arm device is in the stowed vertical position, with assembly mounted to the rear luggage carrier rack 206.

FIG. 41—displays a full image of tadpole style trike with series 300 manual model with safety sleeve/arm device attached to seat frame and placed in the active horizontal position.

FIG. 42—shows the full image of tadpole style trike with series 300 manual model with safety sleeve/arm device attached to seat frame and placed in the stowed vertical position.

FIG. 43—displays a full image of a traditional bicycle with series 500 electromechanical mechanism, with safety sleeve/arm device attached and placed in the active horizontal position.

FIG. 44—shows the full image of a traditional bicycle with series 500 electromechanical mechanism, with safety sleeve/arm device attached and placed in the stowed vertical position.

FIG. 45—displays a typical wiring diagram for the electromechanical series 500 mechanisms with key fob controller 902, along with a plan view of a trunk bag showing the wiring harness routing with the transceiver and battery mount locations inside.

Alternative Embodiments: FIGS. 4, 5, 8, 11, 13, 14, and 23 to 31

FIG. 4—displays plan view of series 300 hand operated assembly. This manually actuated design is suitable for mounting on a horizontal tubular frame member. Spar arm 602a is attached to base plate 302, along with the adjustable mechanical stop 508. The XLPE foam safety sleeve 702 has ultra-brilliant LED strip lights 710 installed.

FIG. 5—displays plan view of series 400 hand operated, manually actuated design for a traditional two-wheeled bicycle 102. Assembly includes base plate 402 connected to spar arm 602a, with an adjustable mechanical stop 508 strategically located. This assembly is suitable for mounting to a typical seat post rack FIG. 38, or bicycle/tricycle rear luggage carrier rack.

FIG. 8—displays plan view of series 400 manually actuated design for a traditional two-wheeled bicycle 102. Assembly includes base plate 402 connected to spar arm 602a, with an adjustable mechanical stop 508 strategically located and attached to base plate 402. This assembly is suitable for mounting to a seat post beam rack, or typical bicycle/tricycle rear luggage rack accessory. The "European Design" (horizontal right-side active position) is a mirror image of the North American version. All components supplied are the same for both North American and European applications.

FIG. 11—displays plan view of the manually actuated series 300 assembly designed for a traditional three-wheeled Tricycle 202. Assembly includes base plate 302 connected to spar arm 602a, with an adjustable mechanical stop 508 strategically located and attached to base plate 402. Assembly is suitable for mounting on a horizontal tubular frame member, such as the top of a recumbent seat frame. The "European Design" (horizontal right-side active position) is a mirror image of the North American version. All components supplied are the same for both North American and European applications.

FIG. 13—shows assembly plan view for series 400 manually actuated model, with standard detent locations for spar arm positioning.

FIG. 14—shows assembly plan view for series 300 manually actuated model, with standard detent locations for spar arm positioning.

NOTE: Although all models have a different OD configuration, all models share the following common design parameters.

(a) The index detent patterns on base plates 503, 502, 402 and 302 for locating universal spar arm into the horizontal (active) or vertical (stowed) positions are identical.
(b) Spar Arm 602a-b is interchangeable between all models.
(c) Adjustable vertical and horizontal mechanical stop 508 and 508c hardware is interchangeable.
(d) Components related to assembly and fastening of universal spar arm 602a-b to base plates are identical.
(e) Mount hole locations for installing series 400 and series 500 models onto a traditional seat post beam mount, or bicycle/tricycle rear luggage rack have the same dimensional pattern.
(f) Series 500 models, with base plates (502 & 503) can also operate as a manually actuated system as shown in embodiment FIG. 16

FIG. 23A and FIG. 23B—displays plan view and side elevation view of hand operated series 400 assembly using base plate 402. All dimensions and mechanical components shown in this embodiment related to the indexing mechanism are identical in use, supply and operation as previously described for series 500 apparatus. The variations of this manually actuated model compared to series 500 mechanism(s) is as follows.

Differences: Series 400 vs Series 500 Models
(a) The OD outline configuration for fabricated base plate 402.
(b) Omitted support riser 504 used for electric linear actuator 506.

(c) Omitted Electric linear actuator 506 and hardware.

(d) For mounting/installation purposes, I added alternate fastener 404*a-c* to further assist the user when mounting base plate 402 onto a seat post beam rack, or traditional rear bag bicycle/tricycle rack shown in embodiment FIG. 38.

(e) The alternate (phantom) location for mechanical stop 508, would allow a cyclist to position the spar arm 602 with safety sleeve 702 approximately 30 degrees below the horizontal level position on the right side. This allows the cyclist to mount the bicycle using the popular "cowboy" approach, which is to swing their leg over the top of the apparatus.

Interchangeable support spar arm 602*a-b* is identical to the model previously described in embodiment FIG. 19 and FIG. 22.

FIG. 24—displays the perspective view of hand-operated, manually actuated series 400 assembly.

FIG. 25—shows the exploded view of hand-operated series 400 using base plate 402. All mechanical components shown in this embodiment are identical in use, supply and operation as previously described for series 500 apparatus. Compared to series 500 mechanism(s), the only variation with this manually actuated version is as previously described in the embodiment ref. FIGS. 23A & 23B.

FIG. 26A—displays plan view of series 300 model using base plate 302.

FIG. 26B—displays side elevation view of hand operated version series 300 using base plate 302. All dimensions and mechanical components shown in both embodiments FIG. 26A and FIG. 26B related to the indexing mechanism are identical in use, supply and operation as previously described for series 500 models. The variations of this manually actuated model compared to series 500 mechanism(s) is as follows.

Differences: Series 300 vs Series 500 Models
(a) The OD outline configuration.
(b) Omitted actuator support riser 504 and hardware.
(c) Omitted electric linear actuator 506 and hardware.
(d) Center fastener 306*a-c* added to facilitate mounting to tee mount assembly 304.
(e) Two (2) Anti-rotational stops 310*a-e* added. These fastener bolts shown with protective vinyl sleeves act to sandwich the horizontal tubular member to prevent base plate 302 from rotating once fastener 306*a-c* has secured the apparatus to tee clamp mount assembly 304.
(f) Two (2) Optional fasteners 312*a-c* to facilitate mounting of an optional neck rest bracket (not shown).
(g) Tee clamp mount assembly 304 adaptable to a 25 mm-29 mm (1"-1.125") OD tubing. (Ref. embodiments FIG. 29-31).

FIG. 27—displays perspective view of manually actuated series 300 apparatus.

FIG. 28—shows the exploded view of hand-operated series 300 apparatus using base plate 302. All dimensions and components shown in this embodiment related to indexing mechanism 302 are identical in use, supply and operation as previously described for series 500 model. The variations of this manually actuated model compared to series 500 mechanisms are the same as previously described for embodiment FIG. 26.

Spar arm 602*a-b* is identical to the model previously described in embodiment FIGS. 19 & 22.

FIG. 29—shows base plate 302 installed on a tubular seat frame using tee clamp mount assembly 304. Tee clamp mount 304 design will accommodate a 25 mm-29 mm (1"-1.125") tubular seat frame typically used for a tadpole or delta style three-wheeled trike vehicle.

FIG. 30—shows the perspective view of tee clamp mount assembly 304 with protective rubber inserts 314.

FIG. 31—is an exploded view of mounting hardware and fabricated components for securing base plate 302. Split tee mount 304*a* and 304*b* are comprised from two (2) molded plastic pieces. A composite material was selected for core plug insert 304*d*, with a blind nut 304*c* installed into this component, followed by cementing insert 304*d* into tee section piece 304*b*. Rubber inserts 314 are used to create a snug fit and protect the tubular frame finish. Once inserts 314 are in place, two (2) split tee pieces 304*a* and 304*b* are positioned onto the tubular structure. Two clamps 304*e* are used to secure assembly. Fasteners 306*a-c* are used to secure series 300 mechanism to tee clamp mount 304 assembly.

CONCLUSION, RAMIFICATIONS AND SCOPE

The reader will find that at least one embodiment of the safety distance buffer apparatus provides a more reliable, durable, lightweight and effective device. A device that a multitude of cyclists can use for most, if not all, two and three wheeled pedal vehicles. While my description contains many specificities, please do not construe these as limitations on the scope, but as an exemplification of embodiments thereof.

Advantages:
(a) The overall design of the indexing mechanisms use a common dimensional pattern that are repeated throughout the multiple base plate iterations.
(b) We do not limit the use of HDPE material to fabricate the indexing systems, for other materials such as plastics, composites, or metal are satisfactory.
(c) Spar arm and hardware are of a common design to allow interchangeability between all base plate configurations.
(d) Should electric linear actuator become inoperable for any reason, series 500 mechanism's design allows the system to function manually. This is accomplished simply by disconnecting the fastener bolt used to secure the linear actuator push rod to spar arm.
(e) The user can opt to begin with a series 500 model with either base plate 502 or 503 and use this device as a manual system. Then, whenever the desire arises they can upgrade to the electromechanical device. This upgrade requires the user to order the remaining parts needed 504, 506, and applicable wiring harness FIG. 45 with key fob 902 to make this conversion.
(f) The design also allows for easy installation/mount interchangeability between base plate models.
(g) We do not limit the use of XLPE material for the fabrication of safety sleeve 702. Other similar materials, colors and shapes may prove satisfactory, provided they meet the flexibility and structural integrity requirement for the application.
(h) We do not limit the use and number of the ball plungers as described. We consider other similar or equivalent locater type components as satisfactory.
(i) The electromechanical design is not limited to using an electric linear actuator, for other similar or equivalent linear, or rotary electric, pneumatic, or hydraulic actuators would be satisfactory.
(j) Other equivalent or similar LED lights are acceptable, along with suitable controls capable of varying the brightness, pulse mode and pulse frequency are also satisfactory.

I claim:

1. A safety distance buffer apparatus for a bicycle or tricycle which is lightweight, portable and convertible from a manually operated device to an electrically actuated mechanism, designed to create a dimensional frame of reference for the distance a motorist should allow to provide adequate clearance when passing a pedal vehicle, the safety distance buffer apparatus comprising: a base plate, a support riser and a spar arm having a body of material composed of high density polyethylene;

wherein said base plate has a plurality of detent index locations strategically placed in a radius pattern to establish means for adjoining said spar arm to reach a 0-90 degree vertical to horizontal movement and vice versa; wherein said spar arm has a ball plunger set of locators mounted at said pivotal end of said spar arm, that dimensionally align with said detents in said base plate, placed in said radius pattern, which contains means for said spar arm to rotate and firmly seat into a plurality of said detent index positions, providing means for said spar arm to transition from an active horizontal position, to a vertical inactive position and vice versa, including a mechanical stop at each position to prevent over travel potential.

2. The safety distance buffer apparatus of claim 1, wherein said spar arm is pivotally connected to said base plate with a fastener mount which contains means for said spar arm to rotate.

3. The safety distance buffer apparatus of claim 1, wherein said spar arm has a dual spring breakaway joint, which provides for flexibility of said spar arm, therefore reducing the possibility of damage to the device due to vehicle impact or from said spar arm impacting a vehicle, or other objects.

4. The safety distance buffer apparatus of claim 1, wherein said spar arm is a universal, interchangeable member that is removable, portable, and transferrable between bicycles and tricycles.

5. The safety distance buffer apparatus of claim 1, wherein the safety distance buffer apparatus comprises a brightly colored safety sleeve made of a low density, flexible cross linked polyethylene (XLPE) material having an aerodynamic airfoil shape having a rounded leading edge tapering down to a trailing edge; the safety sleeve further comprising a longitudinal through-hole the entire length of said safety sleeve; wherein the safety distance buffer apparatus is removable, portable, and interchangeably mounted on bicycles and tricycles.

6. The safety distance buffer apparatus of claim 5, wherein said brightly colored safety sleeve further includes a lighting and a reflective tape system comprising light emitting diode (LED) strip lights mounted on said trailing edge of said safety sleeve and a single LED wing tip light, all of which are connected to an independent battery power source.

7. The safety distance buffer apparatus of claim 6, wherein said reflective tape is added around both top and bottom ends of said safety sleeve and longitudinally on said rounded leading edge of said safety sleeve.

8. A safety distance buffer apparatus for a bicycle or tricycle comprising a spar arm configured as a hand operated device that converts to a semi-automatic electromechanical apparatus, wherein the spar arm comprises an electric linear actuator with a push rod shaft having minimum and maximum internal stroke contact limits; wherein said semi-automatic electromechanical apparatus is controlled by a direct wired or a wireless remote key fob, having up and down buttons that interface with latching relay contacts, that automatically disconnect the power supply when said push rod reaches fully extended or fully retracted travel limits, and confirms said spar arm and said safety sleeve are in selected position.

9. A method of operation a safety distance buffer, comprising:
(a) providing an indexing device with a positive detent location system to position a brightly colored airfoil shaped safety arm, that extends out and away from the frame of a two wheel or three wheel pedal vehicle, to dissuade a motorist from approaching a cyclist too close when passing;
(b) providing said safety arm with a semi-automatic electromechanical actuator, that allows the cyclist to easily move said safety arm at the push of a button, into either an active horizontal position, or vertical inactive position while the pedal vehicle is in motion;
(c) providing light emitting diode (LED) lights with controls that provide multitude of frequency and pulse variations, along with reflective tape on both ends to further enhance the visibility of said safety arm.

10. The method of claim 9 wherein said safety arm is made of a low density cross linked polyethylene yellow colored foam.

* * * * *